United States Patent
Fang

(10) Patent No.: US 11,784,326 B2
(45) Date of Patent: Oct. 10, 2023

(54) FUEL CELL, BIPOLAR PLATE AND BIPOLAR PLATE ASSEMBLY FOR FUEL CELL

(71) Applicant: QING POWER CO., LTD., Beijing (CN)

(72) Inventor: Mou Fang, Beijing (CN)

(73) Assignee: QING POWER CO., LTD., Beijing (CN)

( * ) Notice: Subject to any disclaimer, the term of this patent is extended or adjusted under 35 U.S.C. 154(b) by 0 days.

(21) Appl. No.: 18/010,414

(22) PCT Filed: Apr. 26, 2021

(86) PCT No.: PCT/CN2021/089859
§ 371 (c)(1),
(2) Date: Dec. 14, 2022

(87) PCT Pub. No.: WO2021/218905
PCT Pub. Date: Nov. 4, 2021

(65) Prior Publication Data
US 2023/0197979 A1    Jun. 22, 2023

(30) Foreign Application Priority Data
Apr. 28, 2020   (CN) .......................... 202010349746.9

(51) Int. Cl.
*H01M 8/026* (2016.01)
*H01M 4/86* (2006.01)
(Continued)

(52) U.S. Cl.
CPC ......... *H01M 8/026* (2013.01); *H01M 4/8631* (2013.01); *H01M 8/0263* (2013.01);
(Continued)

(58) Field of Classification Search
CPC .. H01M 8/026; H01M 4/8631; H01M 8/0263; H01M 8/0267; H01M 8/0273;
(Continued)

(56) References Cited

U.S. PATENT DOCUMENTS

| | | | |
|---|---|---|---|
| 2005/0221149 A1* | 10/2005 | Matsubayashi | H01M 8/0258 429/511 |
| 2008/0070080 A1* | 3/2008 | Miyazaki | H01M 8/0263 429/492 |

FOREIGN PATENT DOCUMENTS

| | | |
|---|---|---|
| CN | 101027806 | 8/2007 |
| CN | 101141007 | 3/2008 |

(Continued)

*Primary Examiner* — Muhammad S Siddiquee
(74) *Attorney, Agent, or Firm* — Treasure IP Group, LLC

(57) ABSTRACT

The disclosure relates to a fuel cell, a bipolar plate and a bipolar plate assembly for a fuel cell. The bipolar plate comprises: at least one distributing region; at least one first through hole which communicates with the distributing region via a circumferential opening on a sidewall as an inlet of a first reactant; and at least one second through hole which communicates with the distributing region via a circumferential opening on a sidewall as an outlet of a first reactant. Each of the at least one first through hole and the at least one second through hole has a cross section of approximately trapezoid with an arc edge or an oblique edge, and the circumferential opening is formed on a curved sidewall or on an oblique sidewall. The fuel cell has improved structural design of the bipolar plate to improve flow uniformity and hydrothermal management of the fuel cell.

31 Claims, 8 Drawing Sheets

(51) Int. Cl.
  *H01M 8/1004* (2016.01)
  *H01M 8/0263* (2016.01)
  *H01M 8/0273* (2016.01)
  *H01M 8/2484* (2016.01)
  *H01M 8/0267* (2016.01)
  *H01M 8/04029* (2016.01)
  *H01M 8/10* (2016.01)

(52) U.S. Cl.
  CPC ....... *H01M 8/0267* (2013.01); *H01M 8/0273* (2013.01); *H01M 8/04029* (2013.01); *H01M 8/1004* (2013.01); *H01M 8/2484* (2016.02); *H01M 2008/1095* (2013.01)

(58) Field of Classification Search
  CPC ........... H01M 8/04029; H01M 8/1004; H01M 8/2484; H01M 2008/1095
  See application file for complete search history.

(56) References Cited

FOREIGN PATENT DOCUMENTS

| | | |
|---|---|---|
| CN | 102939678 | 2/2013 |
| CN | 103098277 | 5/2013 |
| CN | 105027343 | 11/2015 |
| CN | 109546158 | 3/2019 |
| CN | 210296508 | 4/2020 |
| CN | 111293325 | 6/2020 |
| CN | 211929619 | 11/2020 |
| CN | 212392280 | 1/2021 |
| JP | 2006172924 A | 6/2006 |
| JP | 2007184200 | 7/2007 |
| JP | 2007213971 A | 8/2007 |
| JP | 2008004565 A | 1/2008 |
| JP | 2010118306 A | 5/2010 |

\* cited by examiner

FUEL CELL, BIPOLAR PLATE AND BIPOLAR PLATE ASSEMBLY FOR FUEL CELL

CROSS REFERENCE TO RELATED APPLICATION

This application claims priority to a PCT application PCT/CN2021/089859 filed on Apr. 26, 2021, which in turn claims priority to a Chinese Application No. 202010349746.9, filed on Apr. 28, 2020. The PCT and Chinese Applications are incorporated herein by reference in their entireties.

FIELD OF THE DISCLOSURE

The present disclosure relates to a fuel cell, and more particularly, to a fuel cell, a bipolar plate and a bipolar plate assembly for a fuel cell.

DESCRIPTION OF THE RELATED ART

Fuel cell is a power generation device which generates electric energy by an electrochemical reaction between methanol or hydrogen and oxidizing gas in a catalytic layer of a membrane electrode assembly. The fuel cell includes, for example, an electrolyte membrane, and a catalytic layer, a diffusion layer, and a bipolar plate on each surface of the electrolyte membrane.

During operation of the fuel cell, a fuel fluid is transferred to a surface of the membrane electrode assembly, through a flow channel of a flow field of an anode-side bipolar plate. The transfer process in the membrane electrode assembly includes fuel fluid diffusion to a catalytic layer of anode through an anode-side diffusion layer, and electrons release together with cations formation with the aid of catalyst of the catalytic layer of anode. Electrons are transferred from a surface of the catalytic layer of anode to the anode-side bipolar plate via the anode-side diffusion layer, then from the anode-side bipolar plate to an external circuit, then from the external circuit to a cathode-side bipolar plate, from the cathode-side bipolar plate to a cathode-side diffusion layer, and from the cathode-side diffusion layer to a catalytic layer of cathode. Cations are transferred to the catalytic layer of cathode through the electrolyte membrane. The oxidizing gas combines with the electrons transferred from the anode side on the catalytic layer of cathode to form anions, which combine with the cations migrated through the electrolyte membrane to form water. Thus, an electronic circuit and an ion circuit are completed. Electrolyte membrane has the functions of providing an ion channel and blocking gas and electrons.

A rated power of the fuel cell is a maximum value of an output power which the fuel cell generates continuously under the specified normal operating conditions. An area-specific power is a ratio of the rated power of the fuel cell to an overall active area of the fuel cell. The higher the area-specific power of the fuel cell, the higher the output power of the fuel cell, in a case the fuel cell has a predetermined value of the overall active area. Or, the higher the area-specific power of the fuel cell, the smaller the overall active area of the fuel cell, in a case that the fuel cell has a predetermined value of the output power. In the latter case, the fuel cell may be made by using fewer amounts of materials so as to reduce material cost, and may be made in a miniaturized stack, which is important when the fuel cell is used in vehicles. Therefore, one of key tasks in the development of a fuel cell stack is to increase an area-specific power of the fuel cell.

In order to increase the area-specific power of the fuel cell, reactants need to be more uniformly distributed on an active area, so that the reactants are better involved in the reaction on the catalytic layer, and an current generated by the electrochemical reaction is better introduced to an external circuit, and water and excess heat which are generated by the electrochemical reaction are exhausted more quickly. For example, there is a company which proposed a structural design of a three-dimensional fine-grid flow field to distribute the reactants uniformly. However, the three-dimensional fine-grid flow field has a fine structure, and needs to have thermal stability and stress stability. A titanium plate is used for defining the three-dimensional fine-grid flow field, which needs a higher manufacturing accuracy and a more difficult manufacturing process. Thus, high-performance manufacturing equipment and high-performance testing equipment are required for forming the three-dimensional fine-grid flow field, and a material cost is also increased.

It is desirable to have a better solution, which can further uniformly distribute reactants of the fuel cell, increase the area-specific power, and reduce the manufacturing cost.

SUMMARY OF THE DISCLOSURE

In view of the above problems, one object of the present disclosure is to provide a fuel cell, a bipolar plate and a bipolar plate assembly for a fuel cell. The bipolar plate includes at least one distributing region and a plurality of through holes. Circumferential openings are formed on curved or oblique sidewalls of the plurality of through hole as inlets or outlets of reactants, so as to improve flow uniformity and hydrothermal management of the fuel cell, thereby improving large-current discharge performance and power density of the fuel cell.

According to a first aspect of the present disclosure, there is provided a bipolar plate for a fuel cell, comprising: a substrate; at least one distributing region on a first surface of the substrate, for supplying a first reactant to a membrane electrode assembly of the fuel cell; at least one first through hole adjacent to a first edge of the substrate and penetrating through the substrate, which has a circumferential opening on a sidewall and being communicated with the corresponding one of the at least one distributing region, as an inlet of a first reactant; and at least one second through hole adjacent to a second edge of the substrate and penetrating through the substrate, which has a circumferential opening on a sidewall and being communicated with the corresponding one of the at least one distributing region, as an outlet of the first reactant, the second edge being opposite to the first edge, wherein each of the at least one first through hole and the at least one second through hole has a cross section of approximately trapezoid with an arc edge or an oblique edge, and the circumferential opening is formed on a curved sidewall corresponding to the arc edge or on an oblique sidewall corresponding to the oblique edge.

Preferably, the circumferential opening of the at least one first through hole and the circumferential opening of the second through hole of the corresponding one of the at least one second through hole are opposite to each other along the first edge.

Preferably, the at least one distributing region comprises: a first flow-field structure having a plurality of the first flow channels separated from each other by a plurality of ridges, the plurality of the first flow channels extending from an inlet of the first flow-field structure to the outlet of the first flow-field structure; a first flow-guiding structure having a plurality of first grooves separated from each other by a plurality of first spacers, the plurality of first grooves being arranged radially and extending from the circumferential opening of the corresponding one of the at least one first through hole to the inlet of the first flow-field structure; and a second flow-guiding structure having a plurality of second grooves separated from each other by a plurality of second spacers, the plurality of second grooves being arranged radially and extending from the circumferential opening of the corresponding one of the at least one second through hole to the outlet of the first flow-field structure.

Preferably, the plurality of first grooves of the first flow-guiding structure have a cross-sectional area which is gradually increased in a flow passage of the first reactant, and the plurality of second grooves of the second flow-guiding structure has a cross-sectional area which is gradually decreased in the flow passage of the first reactant.

Preferably, the plurality of the first flow channels of the first flow-field structure is of any shape of a linear shape, a curved shape and a serpentine shape.

Preferably, the bipolar plate is an anode plate, and the first reactant that is supplied form the anode plate to the membrane electrode assembly is a fuel fluid, and the first through hole has a top edge and a bottom edge in the cross section, and a length of the top edge is $1/3$ to $19/20$ of that of the bottom edge.

Preferably, the plurality of the first flow channels of the first flow-field structure includes 25 to 70 channels.

Preferably, a ridge width of the first flow-field structure is between 30 and 500 microns, and a channel width of the first flow-field structure is between 30 and 500 microns.

Preferably, the first grooves of the first flow-guiding structure have 2 to 10 grooves, and the second grooves of the second flow-guiding structure have 2 to 10 grooves, respectively.

Preferably, the bipolar plate is a cathode plate, and the first reactant that is supplied form the anode plate to the membrane electrode assembly is an oxidizing gas, and the first through hole has a top edge and a bottom edge in the cross section, and a length of the top edge is $1/6$ to $5/6$ of that of the bottom edge.

Preferably, the plurality of the first flow channels of the first flow-field structure include 25 to 70 channels.

Preferably, the first flow-field structure has a ridge width of between 30 and 500 microns and a channel width of between 30 and 500 microns.

Preferably, the first grooves of the first flow-guiding structure have 2 to 10 grooves, and the second grooves of the second flow-guiding structure have 2 to 10 grooves, respectively.

Preferably, the at least one distributing region 15 includes a plurality of distributing regions, the first flow-field structures of the plurality of distributing regions are arranged in sequence on the first surface of the substrate to form a plurality of groups of first flow channels, the first flow-guiding structures of the plurality of distributing regions are separated from each other, and the second flow-guiding structures of the plurality of distributing regions are separated from each other.

Preferably, the substrate includes a peripheral portion which is recessed relative to the first surface and is used as a sealing groove.

Preferably, the substrate includes a peripheral portion which protrudes relative to the first surface and is used as a sealing member.

Preferably, the substrate includes a peripheral portion which flushes with the first surface and is used as a contact surface of a sealing frame.

Preferably, the bipolar plate further comprises: a plurality of partition walls located between the first flow-guiding structures and between the second flow-guiding structures of adjacent ones of the plurality of distributing regions.

Preferably, the bipolar plate further comprises: at least one third through hole adjacent to the first edge of the substrate and penetrating through the substrate, as an inlet of a second reactant; at least one fourth through hole adjacent to the second edge of the substrate and penetrating through the substrate, as an outlet of the second reactant; at least one fifth through hole adjacent to the first edge of the substrate and penetrating through the substrate, as an inlet of a coolant; and at least one sixth through hole adjacent to the second edge of the substrate and penetrating through the substrate, as an outlet of the coolant.

Preferably, the at least one first through hole, the at least one third through hole and the at least one fifth through hole are arranged in a row on the first edge of the substrate in the order of a first through hole, a fifth through hole and a third through hole, and the at least one second through hole, the at least one fourth through hole and the at least one sixth through hole are arranged in a row on the second edge of the substrate in the order of a fourth through hole, a sixth through hole and a second through hole.

Preferably, each of the at least one fifth through hole and the at least one sixth through hole has a cross section of an approximately-rectangular shape, and a side edge of the cross section of the at least one fifth through-hole is adjacent to a top edge of the cross section of the at least one first through-hole, and a side edge of the cross section of the at least one sixth through-hole is adjacent to a top edge of the at least one second through-hole cross-sectional shape, and a length of the side edge is less than or equal to a length of the top edge.

Preferably, the bipolar plate further comprises: at least one cooling region on a second surface of the substrate, which is communicated with the at least one fifth through hole and the at least one sixth through hole, for supplying a coolant to a second surface of the bipolar plate.

Preferably, the substrate further has a third edge and a fourth edge opposite to each other, and tabs are formed on the third edge and the fourth edge, and the tabs are used as test terminals when testing the fuel cell.

Preferably, each of the tabs includes a positioning hole for aligning a plurality of bipolar plates.

According to a second aspect of the present disclosure, there is provided a bipolar plate assembly for a fuel cell, comprising: a bipolar plate as mentioned above; a sealing frame having a rim which contacts a peripheral portion of the bipolar plate and a central opening of the sealing frame which exposes an active region of the bipolar plate; and a gasket which covers top surfaces of the first and second flow-guiding structures of the at least one distributing region to form a closed flow-guiding channel.

Preferably, the sealing frame includes a plurality of through holes which are aligned with a plurality of through holes in the bipolar plate respectively, a central opening which communicates with the at least one first through hole and the at least one second through hole of the sealing frame, so that the first reactant flows into the first flow-guiding structure through a circumferential opening of the at least one first through hole and flows out of the second flow-guiding structure through a circumferential opening of the at least one second through hole.

Preferably, the gasket comprises: a first sub-sheet which covers the top surface of the first flow-guiding structure; and a second sub-sheet which covers the top surface of the second flow-guiding structure.

According to a third aspect of the present disclosure, there is provided a fuel cell, comprising: a repetitive unit which includes an anode plate, a cathode plate, a membrane electrode assembly sandwiched therebetween, and a first group of main pipelines, a second group of main pipelines, and a third group of main pipelines which are formed at peripheral portions of the repetitive unit and extend in a stacking direction; and a flow-distributing unit which includes a first terminal plate, and a first pair of manifolds, a second pair of manifolds and a third pair of manifolds which are formed in the first terminal plate and respectively communicate with the first group of main pipelines, the second group of main pipelines and the third group of main pipelines, for transferring a fuel fluid, an oxidizing gas and a coolant, respectively, wherein each of the anode plate and the cathode plate is the one according to any one of claims 1 to 23.

Preferably, the fuel cell further comprises: a first current collector and a first insulating plate stacked in sequence on a first surface of the repetitive unit; a second current collector and a second insulating plate stacked in sequence on the second surface of the repetitive unit; and a second terminal plate, the first terminal plate and the second terminal plate securing the repetitive unit, the first current collector, the second current collector, the first insulating plate and the second insulating plate, wherein the first insulating plate is sandwiched between the first terminal plate and the first current collector, the second insulating plate is sandwiched between the second terminal plate and the second current collector, and the first group of main pipelines, the second group of main pipelines, and the third group of main pipelines pass through the first current collector and the first insulating plate in a stacking direction.

Preferably, the fuel cell further comprises: a first pressing plate and a second pressing plate located on opposite sides of the fuel cell, each of which has a lower flange and an upper flange, wherein the lower flange of the first pressing plate is in contact with one bottom edge of the first terminal plate, the lower flange of the second pressing plate is in contact with another bottom edge of the first terminal plate, and the upper flange of the first pressing plate is in contact with one top edge of the first terminal plate, the upper flange of the second pressing plate is in contact with another top edge of the second terminal plate, so that the lower flanges press against the bottom surface of the first terminal plate, and the upper flanges press against the top surface of the second terminal plate, to provide a securing force between the first terminal plate and the second terminal plate.

Preferably, wherein each of the upper flange of the first pressing plate and the upper flange of the second pressing plate further includes a plurality of screw holes, through which a plurality of bolts pass and apply additional pressure to the top surface of the second terminal plate.

Preferably, the fuel cell further comprises: a first interconnect plate and a second interconnect plate which are located at opposite side surfaces of the first terminal plate and each of which includes a plurality of interfaces for connecting a plurality of external pipelines, wherein inner openings of the plurality of interfaces in the first interconnect plate and in the second interconnect plate are respectively aligned with openings of the first pair of manifolds, the second pair of manifolds and the third pair of manifolds in the flow-distributing unit to communicate with each other.

According to an embodiment of the present disclosure, the bipolar plate has a first surface on which a plurality of through holes and at least one distributing region are formed. The at least one distributing region includes, for example, an ultra-fine flow-field structure and a first and second flow-guiding structures, for supplying reactants to a membrane electrode assembly. The through holes of the bipolar plate form portions of main pipelines. Each of the through holes has a cross section of approximately trapezoid with an arc edge or an oblique edge, so as to form a curved sidewall or an oblique sidewall of a mail pipeline. Further, circumferential openings are formed on the curved sidewall or the oblique sidewall as inlets and outlets, so that reactants flow into and out of flow-guiding structures through the circumferential openings and pass through an ultra-fine flow-field structure to supply the reactants to a membrane electrode assembly of the fuel cell. In the bipolar plate, the circumferential openings on the oblique sidewall can increase a width of the passage of the reactants to the flow-guiding structures, so that the flow of reactants is smoother and the distribution is more uniform. The flow-guiding structure of the bipolar plate includes a plurality of grooves being arranged radially, which effectively avoids the situation that less reactant are distributed in a flow channel far away from the main pipeline. Moreover, there is difference in a flow resistance between an inlet and an outlet in a flow passage on a first surface of the bipolar plate. Not only the reactant is distributed on the bipolar plate more uniformly, but also the reactant has a higher concentration in a plane direction of the membrane electrode assembly so as to reduce energy loss of electrochemical reaction. Therefore, the fuel cell including the bipolar plate can improve an area-specific power.

In a preferred embodiment, the bipolar plate may be designed as having a plurality of distributing regions on a surface, each of which has a flow-field structure, a pair of through holes, and a pair of flow-guiding structures separated from each other. With the design, both the number of bipolar plates and the number of distributing regions on one bipolar plate can be flexibly adjusted to increase or reduce active areas of the fuel cell, in accordance with the power requirement of the fuel cell. In a case that the number of bipolar plates and/or the number of distributing regions are increased, the reactants can still flow on each bipolar plate with uniform distribution among a plurality of distributing regions. Furthermore, in a case that some distributing regions of the bipolar plate fail, for example, because the flow of the reactants is blocked, other distributing regions of the bipolar plate can still work normally. That is, at least some power generation units of a fuel cell can still work normally, in a case that other power generation units fail. Only an overall output power of the fuel cell stack is decreased. It is referred to as being adapatative that the fuel cell stack can maintain normal operation as a whole in a case that some local failure occurs in the fuel cell stack. Therefore, the fuel cell including the bipolar plate can be manufactured in modules in a flexible manner and with improved reliability. Moreover, the design of a single-row fuel cell stack with multiple distributing regions also simplifies the design of manifolds and current collectors, thereby decreasing the number of various parts and reducing the cost of materials.

In a preferred embodiment, a second surface of the bipolar plate includes a flow-field structure and flow-guiding structures for supplying a coolant, so that the bipolar plate is also used as a heat dissipation plate. The flow field on the second surface of the bipolar plate includes flow channels of a zigzag shape to increase a passage length to improve a cooling effect. The bipolar plate can improve flow uniformity and hydrothermal management of the fuel cell, thereby improving large-current discharge performance and power density of the fuel cell.

In a preferred embodiment, the bipolar plate assembly includes a bipolar plate, a sealing frame and a gasket. Three groups of through holes are formed in the bipolar plate for supplying a fuel fluid, an oxidizing gas and a coolant, respectively. The bipolar plate assembly includes a sealing frame and a gasket. On a first surface of the bipolar plate, the sealing frame is used to seal peripheral portions of the bipolar plate and the peripheral portions of two groups of through holes, so as to separate the fuel fluid, the oxidizing gas and the coolant and to prevent the internal and external leakage of the fuel cell. Meanwhile, the gasket is used to close top surfaces of the first and second flow-guiding structures to form a flow-guiding channel. The sealing frame has the function of separating two groups of through holes from the flow-guiding structures and the ultra-fine flow-field structure of bipolar plate. Only a single reactant flows into and out of the ultra-fine flow-field structure through circumferential openings of the remaining one pair of through holes. The ultra-fine flow-field structure of the bipolar plate is attached to a surface of a membrane electrode assembly, so that the fuel fluid or the oxidizing gas can be uniformly supplied to the membrane electrode assembly for electrochemical reaction. In this embodiment, even in a case that an internal temperature of the fuel cell increases, the sealing frame can compensate pressure variation which is caused by expansion with heat and contraction with cold of the bipolar plate and the membrane electrode assembly, so as to maintain sealing performance.

BRIEF DESCRIPTION OF THE DRAWINGS

The above and other objects features and advantages of the present disclosure will become more apparent from the following description of the present disclosure embodiment with reference to the attached drawings.

Figure 1:
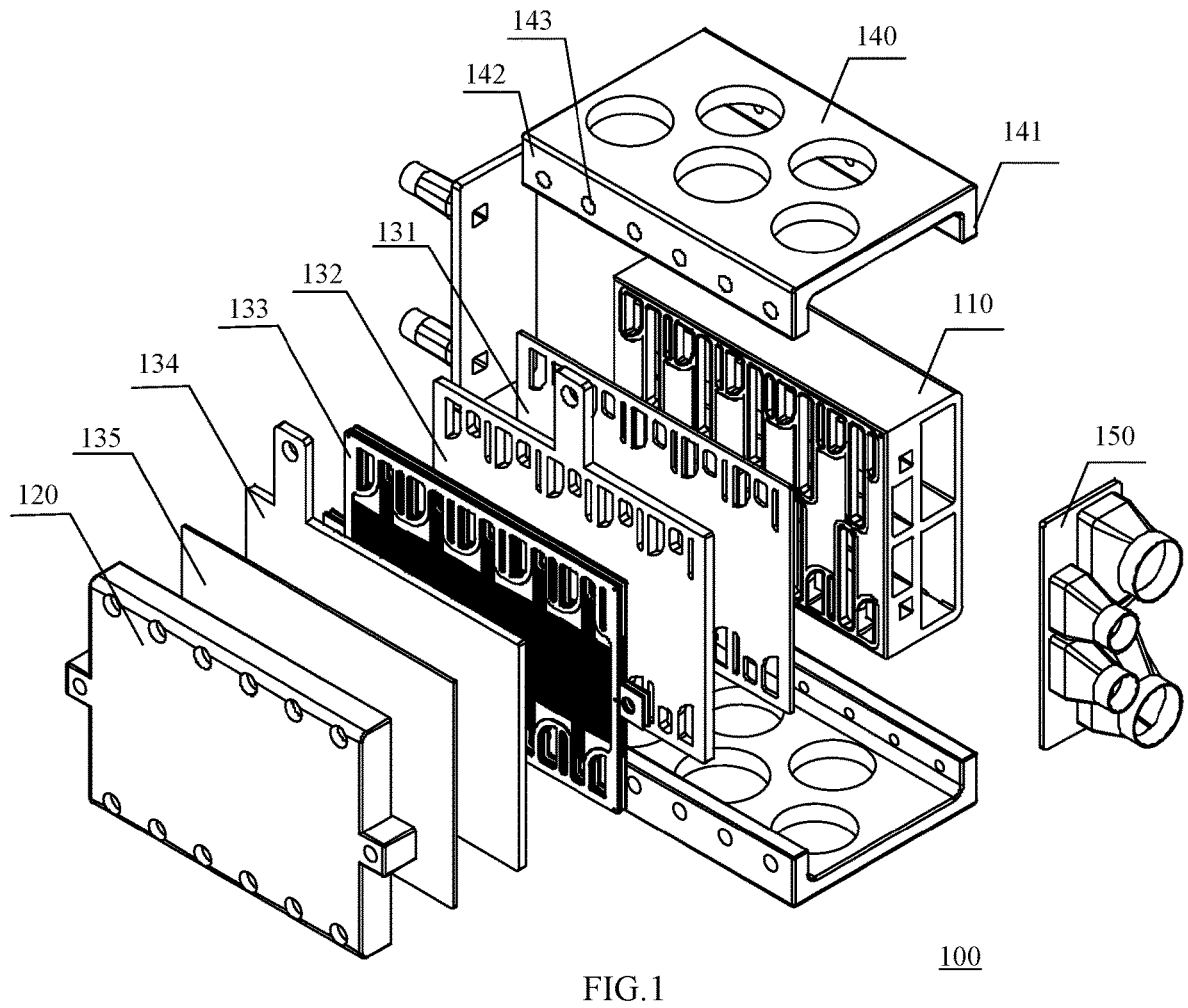
FIG. 1 shows a schematic view of a three-dimensional structure of a fuel cell in an exploded state according to a first embodiment of the present disclosure.

REFERENCE NUMERALS 100 fuel cell
110 first terminal plate
120 second terminal plate
140 pressing plate
150 interconnect plate
131 first insulating plate
132 first current collector
133 repetitive unit
134 second current collector
135 second insulating plate
141 lower flange
142 upper flange
143 screw hole
1 substrate
2 tab
3a first through hole
3b second through hole
4a third through hole
4b fourth through hole
5a fifth through hole
5b sixth through hole
101 anode plate
101a flow-guiding structure of fuel fluid
101b flow-field structure of fuel fluid
101c flow-guiding structure of coolant
101d flow-field structure of coolant
11 flow channels of flow-field structure of fuel fluid
12 ridges of flow-field structure of fuel fluid
13 grooves of flow-guiding structure of fuel fluid
14 spacers of flow-guiding structure of fuel fluid
102, 202, 302 cathode plates
102a flow-guiding structure of oxidizing gas
102b flow-field structure of oxidizing gas
102c flow-guiding structure of coolant
102d flow-field structure of coolant
21 flow channels of flow-field structure of oxidizing gas
22 ridges of flow-field structure of oxidizing gas
23 grooves of flow-guiding structure of oxidizing gas
24 spacers of flow-guiding structure of oxidizing gas
1021, 2021, 3021 peripheral portions of cathode plate
1022, 3022 partition walls of cathode plate
103 membrane electrode assembly
31 electrolyte membrane
32 catalytic layer of anode
33 catalytic layer of cathode
34 diffusion layer of anode
35 diffusion layer of cathode
136 gasket above first surface of anode plate
1361 first sub-sheet
1362 second sub-sheet
138 sealing frame on first surface of anode plate
1381 rim frame
1382 central opening
1383a first through hole
1383b second through hole
1384b third through hole
1384b fourth through hole 1385a fifth through hole
1385b sixth through hole
236 gasket above first surface of cathode plate
2361 first sub-sheet
2362 second sub-sheet
238 seal frame on first surface of cathode plate
2381 rim frame
2382 central opening
2383a first through hole
2383b second through hole
2384b third through hole
2384b fourth through hole
2385a fifth through hole
2385b sixth through hole
338 sealing frame on second surface of cathode plate or cathode plate
3381 rim frame
3382 central opening
3383a first through hole
3383b second through hole
3384b third through hole
3384b fourth through hole
3385a fifth through hole
3385b sixth through hole

DETAILED DESCRIPTION OF EMBODIMENTS OF THE DISCLOSURE

For ease of understanding the present disclosure, more complete description of the present disclosure will be given below with reference to attached drawings. Preferred embodiments of the present disclosure are given in the drawings. However the present disclosure may be implemented in different forms and is not limited to the embodiments described herein. Rather, these embodiments are provided to enable thorough and comprehensive understanding of the present disclosure.

In this disclosure, the term "ultra-fine flow-field structure" refers to a flow-field structure in which both a channel width and a ridge width are between 30 and 500 microns, and the channel width is generally greater than or equal to the ridge width, but may be less than the ridge width. Moreover, all terms used herein have the same meaning as would normally be understood by those skilled in the art of the present disclosure. Terms are used herein in the present disclosure for the purpose of describing specific embodiments only and are not intended to limit the present disclosure.

Hereinafter, the present disclosure will be described in detail with reference to attached drawings.

First Embodiment

FIG. 1 shows a schematic view of a three-dimensional structure of a fuel cell in an exploded state according to a first embodiment of the present disclosure. A fuel cell 100 includes a first terminal plate 110 and a second terminal plate 120 opposite to each other, between which a first insulating plate 131, a first current collector 132, a repetitive unit 133, a second current collector 134, and a second insulating plate 135 are stacked in order. The first terminal plate 110 is also used as a flow-distributing unit for distributing a fuel fluid, an oxidizing gas and a coolant to the bipolar plates in the repetitive unit 133.

The fuel fluid may be hydrogen gas or methanol or methanol liquid solution. The oxidizing gas may be air or pure oxygen gas. And, the coolant maybe liquid or gas.

The repetitive unit 133 includes bipolar plates and a membrane electrode assembly 103 sandwiched between the bipolar plates. The bipolar plate may be any one of an anode plate 101 and a cathode plate 102, and a cooling plate sandwiched between the anode plate 101 and the cathode plate 102. The repetitive unit 133 has an approximately-rectangular shape in a plane perpendicular to a stacking direction. A first group of main pipelines, a second group of main pipelines, and a third group of main pipelines are provided at peripheral portions of the rectangular shape, which extend in the stacking direction for supplying the fuel fluid, the oxidizing gas, and the coolant to respective flow fields in the bipolar plates, respectively.

A stack of the fuel cell includes, for example, a plurality of repetitive units 133, which are stacked together and electrically connected to each other to increase an output voltage.

The first current collector 132 and the anode plate 101 of the repetitive unit 133 are in contact with each other, both of which are made of a conductive material, thereby forming an anode-side conductive path. The second current collector 134 and the cathode plate 102 of the repetitive unit 133 are in contact with each other, both of which are made of a conductive material, thereby forming a conductive path on the cathode side. The first current collector 132 and the second current collector 134 may be made of a material having strong conductivity, such as a copper plate or an aluminum plate. In this embodiment, the anode plate and the cathode plate 102 of the repetitive unit 133 have the functions of a flow field of a reactant, a heat dissipation plate, a conductive plate, and a supporting plate, thereby simplifying the structure of the fuel cell and reducing a size of the fuel cell.

The first insulating plate 131 is located between the first current collector 132 and the first terminal plate 110, and the second insulating plate 135 is located between the second current collector 134 and the second terminal plate 120, thereby isolating the repetitive unit and the current collector from the first terminal plate 110 and the second terminal plate 120. In a case that the fuel cell 100 includes a plurality of repetitive units, the plurality of repetitive units are stacked between the first current collector 132 and the second current collector 134. A plurality of through holes are formed at peripheral portions of the first insulating plate 131 and the first current collector 132, and respectively aligned to a plurality of through holes at peripheral portions of the repetitive unit 133, so as to form together a plurality of main pipelines which extend along the stacking direction. The plurality of main pipelines include, for example, a first group of main pipelines for supplying the fuel fluid, a second group of main pipelines for supplying the oxidizing gas, and a third group of main pipelines for supplying the coolant.

The fuel cell 100 further includes two pressing plates 140 for securing the first terminal plate 110 and the second terminal plate 120. The two pressing plates 140 are located on opposite sides of the fuel cell 100, each of which includes a lower flange 141 and an upper flange 142 respectively. A lower flange 141 of the pressing plate 140 contacts a bottom edge of the first terminal plate 110, and an upper flange 142 is in contact with the top surface edge of the second terminal plate 120 to form a securing device. The first insulating plate 131, the first current collector 132, the repetitive unit 133, the second current collector 134, and the second insulating plate 135 are secured together by applying pressure to the first terminal plate and the second terminal plate with the upper flange and lower flange of the pressing plate 140. Preferably, the upper flange 142 of the pressing plate 140 has a plurality of screw holes 143, through which bolts pass and apply additional pressure to a surface of the second terminal plate 120. Preferably, a sealing frame is provided between adjacent layers of the stack, so as to seal various layers of the stack while securing various layers of the stack.

In this embodiment, the first terminal plate 110 is also used as a flow-distributing unit. In the first terminal plate, a first pair of manifolds for providing inflow and outflow channels of a fuel fluid, a second pair of manifolds for providing inflow and outflow channels of an oxidizing gas, and a third pair of manifolds for providing inflow and outflow channels of a coolant are formed. In a case that the first terminal plate 110 and the second terminal plate 120 are secured together, top openings of the first pair of manifolds in the first terminal plate 110 are aligned with the first group of main pipelines in the membrane electrode assembly 103 in the repetitive unit 133, top openings of the second pair of manifolds in the first terminal plate 110 are aligned with the second group of main pipelines in the membrane electrode assembly 103 in the repetitive unit 133, and top openings of the third pair of manifolds in the first terminal plate 110 are aligned with the third group of main pipelines in the membrane electrode assembly 103 in the repetitive unit 133. A side surface of the first terminal plate 110 includes openings of the first pair of manifolds the second pair of manifolds and the third pair of manifolds.

The fuel cell 100 further includes two interconnect plates 150 which cover side surfaces of the first terminal plate 110. Each of the two interconnect plates 150 includes a plurality of pipe interfaces for connecting a plurality of external pipelines. The openings of the plurality of pipe interfaces in the interconnect plate 150 are respectively aligned with the openings of the first pair of manifolds, the second pair of manifolds, and the third pair of manifolds in the first terminal plate 110 to communication with each other.

Figure 2:
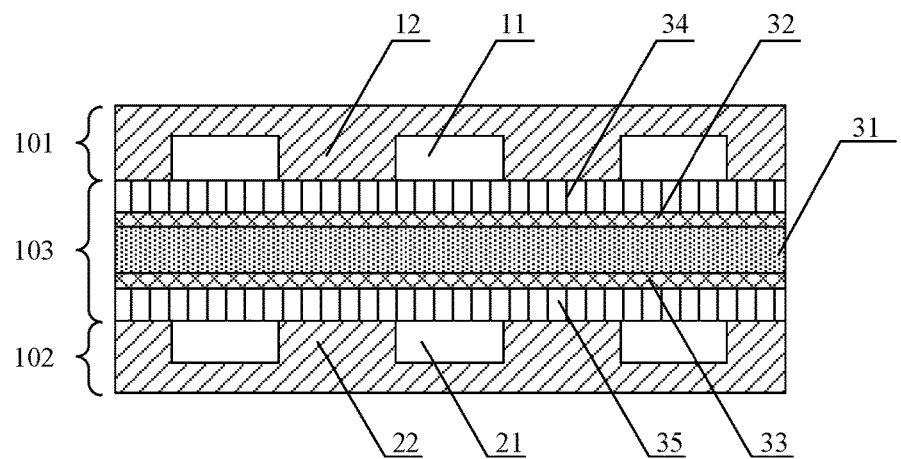
FIG. 2 shows a cross-sectional view of a repetitive unit in a fuel cell according to a first embodiment of the present disclosure.

Referring to FIG. 2, the bipolar plates of the repetitive unit 133 includes an anode plate 101 and a cathode plate 102. The anode plate 101 and the cathode plate 102 are separated from each other with a membrane electrode assembly 103 sandwiched therebetween.

The membrane electrode assembly 103 includes an electrolyte membrane 31, a catalytic layer 32 of anode and an diffusion layer 34 of anode which are stacked in order on a first surface (a fuel fluid side) of the electrolyte membrane 31, and a catalytic layer 33 of cathode and a diffusion layer 35 of cathode which are stacked in order on a second surface (an oxidizing gas side) of the electrolyte membrane 31.

The electrolyte membrane 31 is a selective permeable membrane that transports protons and is electronically insulating. The electrolyte membrane 31 may be one of a fluorine-based electrolyte membranes 31 and a hydrocarbon-based electrolyte membranes 31, in view of a type of an ion exchange resin which constitutes the electrolyte membrane. The fluorine-based electrolyte membrane 31 has a C—F bond (C—F bonding) and therefore has excellent heat resistance or chemical stability. For example, the electrolyte membrane 31 may be a perfluorosulfonic acid membrane well known under the trade name of Nafion (registered trademark DuPont Ltd.).

The catalytic layer 32 of anode contains an electrode catalyst which carries a catalyst component, and a polymer. The electrode catalyst has the function of promoting the reaction of dissociating hydrogen into protons and electrons (hydrogen-oxygen reaction). The electrode catalyst has, for example, a structure in which a catalyst component such as platinum is supported on the surface of an electrically conductive support made of carbon or the like.

The catalytic layer 33 of cathode contains an electrode catalyst which carries a catalyst component, and a polymer. The electrode catalyst has the function of promoting the reaction of protons, electrons and oxygen to generate water (oxygen reduction reaction). The electrode catalyst has, for example, a structure in which a catalyst component such as platinum is supported on the surface of an electrically conductive support made of carbon or the like.

The diffusion layer 34 of anode and the diffusion layer 35 of cathode are respectively made of porous and loose conductive materials, for example, the porous carbon paper material. The diffusion layer 34 of anode and the diffusion layer 35 of cathode uniformly diffuse a fuel fluid and an oxidizing gas from flow passages of the flow fields to surfaces of the catalytic layers of the electrolyte membrane 31, respectively, so that the fuel fluid and the oxidizing gas are in contact with the catalytic layer 32 of anode and the catalytic layer 33 of cathode, respectively.

A first surface of the anode plate 101 is in contact with the diffusion layer 34 of anode in the membrane electrode assembly 103. The anode plate 101 has a flow field of the fuel fluid in a first surface. The flow field of fuel fluid includes a plurality of channels 11, which extend laterally and communicate with the first group of main pipelines. Adjacent ones of the plurality of channels 11 are separated from each other by a ridge 12. The flow channels 11 of the anode plate 101 is open on the first surface, and the fuel fluid is transferred in a direction of the flow channels 11 and delivered to an anode side of the membrane electrode assembly 103.

A first surface of the cathode plate 102 is in contact with the diffusion layer 35 of cathode in the membrane electrode assembly 103. The cathode plate 102 has a flow field of the flow field of oxidizing gas in the first surface. The flow field of oxidizing gas includes a plurality of channels 21, which extend laterally and communicate with the second group of main pipelines. Adjacent ones of the plurality of channels 21 are separated from each other by a ridge 22. The flow channel 21 of the cathode plate 102 is open on the first surface, and the oxidizing gas is transferred in a direction of the flow channel 21 and delivered to a cathode side of the membrane electrode assembly 103.

On the anode side of the membrane electrode assembly 103, the fuel fluid diffuses to the catalytic layer 32 of anode through the diffusion layer 34 of anode of the membrane electrode assembly 103. The fuel fluid generates cations and electrons on the catalytic layer 32 of anode of the membrane electrode assembly 103 by electrochemical reaction. The cations migrate to the cathode side through the electrolyte membrane, and the electrons migrate to the anode plate 101 through the diffusion layer 34 of anode. Then electrons are transferred from the anode side to the cathode side of the membrane electrode assembly 103 via an external circuit. On the cathode side of the membrane electrode assembly 103, electrons migrate to the diffusion layer 35 of cathode via the cathode plate 102, and the oxidizing gas diffuses to the catalytic layer 33 of cathode of the membrane electrode assembly 103 through the diffusion layer 35 of cathode of the membrane electrode assembly 103. The oxidizing gas combines with electrons to form anions, and the anions combine with cations migrated through the electrolyte membrane to form water, thereby forming a current loop.

In the electrochemical reaction described above, the chemical reaction is carried out on the surface of the catalytic layer of cathode of the membrane electrode assembly 103 to generate water. Further, on the cathode side of the membrane electrode assembly 103, because ridges in the flow-field structure of the cathode plate are in close contact with the membrane electrode assembly 103, water generated by the reaction needs to be carried out of an active region while the oxidizing gas passes through flow channels 21 of the cathode plate 102. If the generated water can't be discharged in time and accumulates in the active area, water droplets will be formed and will prevent the oxidizing gas from being in contact with the catalytic layer of cathode. Consequently, the catalytic layer of cathode is flooded by water droplets and cannot participate in the electrochemical reaction, resulting in the phenomenon of "water flooding". On the anode side of the membrane electrode assembly 103, there is water that has been diffused through the electrolyte membrane by reverse osmosis. Thus, a "water flooding" phenomenon may also occur. The phenomenon of "water flooding" affects the electrochemical reaction, thus deteriorating the discharge performance of the fuel cell. For fuel cells, the larger the discharge current, the more water generated by the reaction. It is more likely to produce "water flooding" phenomenon, and the more significant the influence on the discharge performance of the cell.

According to the first embodiment, in the fuel cell 100, the first terminal plate 110 is used not only as a component of the flow-distributing unit, but also as a securing member, and the pressing plates 140 are used not only as side protection members of the fuel cell 100, but also as securing members. The upper and lower flanges of the pressing plates apply pressure to the first terminal plate 110 and the second terminal plate 120 so as to have the function of securing internal stacked layers of the fuel cell 100. Moreover, the bipolar plates of the repetitive unit 133 have the functions of providing flow field of the reactants, heat dissipation, electrical conduction, and support structures. Therefore, the fuel cell 100 according to the first embodiment can reduce the number of components in the fuel cell 100. Because the number of parts of the fuel cell 100 is decreased and its structural design is optimized, the fuel cell 100 according to this embodiment can reduce a height dimension and a lateral dimension, which is beneficial for miniaturization of the fuel cell 100 and the improvement of reliability.

As described below, the present inventor further optimizes flow-guiding structures and a flow-field structure of the bipolar plate to improve flow uniformity of the fuel cell and to improve the hydrothermal management. Thus, the phenomenon of "water flooding" is suppressed, thereby further improving the discharge performance of the fuel cell 100, especially the high-current discharge performance.

Second Embodiment

Figure 3A:
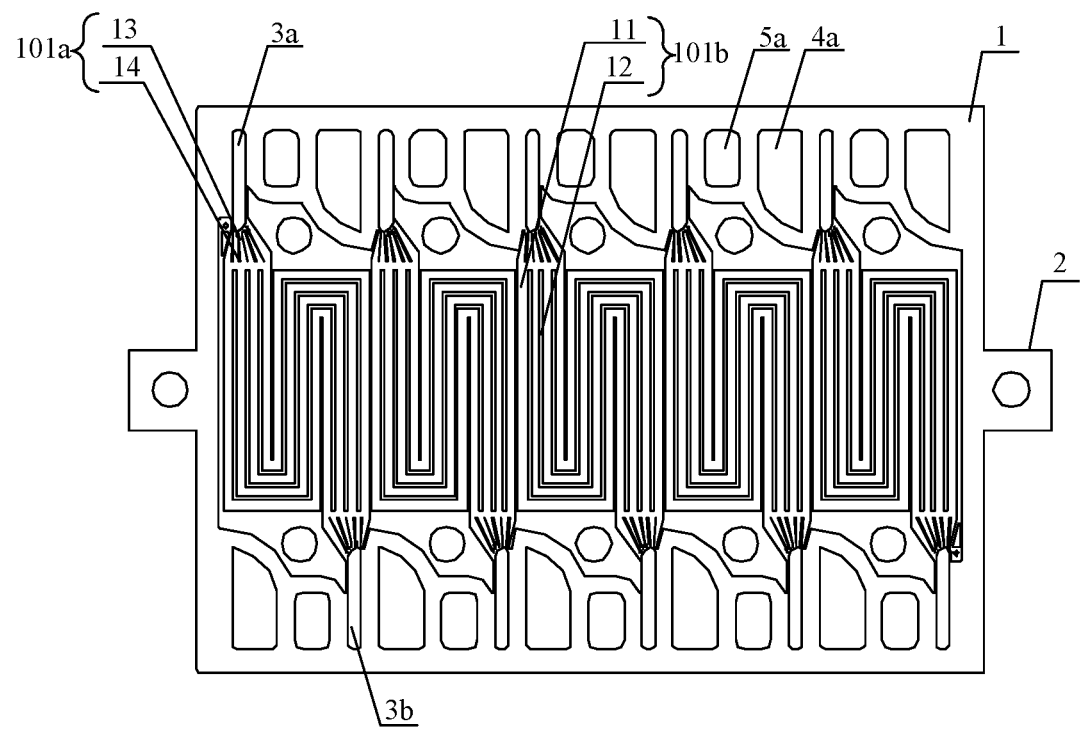
FIGS. 3a and 3b show a bottom view and a top view respectively of an anode plate according to a second embodiment of the present disclosure.
Figure 3B:
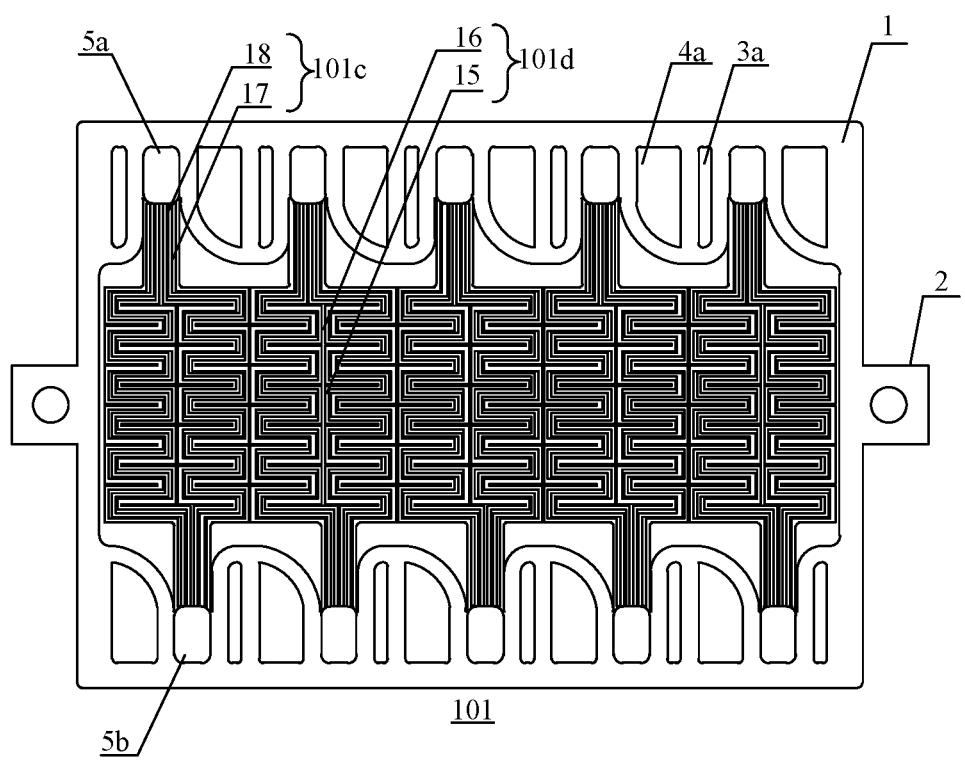

FIGS. 3*a* and 3*b* respectively show a bottom view and a top view of an anode plate according to a second embodiment of the present disclosure. The bottom view is seen from the bottom of the fuel cell, and the top view is seen from the top of the fuel cell.

The anode plate 101 includes a substrate 1 and flow-guiding structures 101*a* and a flow-field structure 101*b* for transferring a fuel fluid on a first surface of the substrate 1, and flow-guiding structures 101*c* and a flow-field structure 101*d* for transferring a coolant on a second surface of the substrate 1. The anode plate 101 has the functions of distributing the fuel fluid and conducting electrons. The anode plate 101 may be made of a material having high mechanical strength and excellent electrical conductivity, such as graphite, stainless steel, titanium alloy, aluminum alloy, copper alloy, etc.

The substrate 1 has an approximately-rectangular shape and includes first and second edges opposite to each other and third and fourth edges opposite to each other. A plurality of groups of through holes are formed and arranged in a row near the first edge of the substrate 1, and each group of through holes includes a first through hole 3*a*, a fifth through hole 5*a*, and a third through hole 4*a* arranged in sequence. A plurality of groups of through holes are formed and arranged in a row near the second edge of the substrate 1, and each group of through holes includes a fourth through hole 4*b*, a sixth through hole 5*b*, and a second through hole 3*b* arranged in sequence. Tabs 2 are formed on the third edge and the fourth edge of the substrate 1, respectively. The tabs 2 are used as detection terminals when being connected with a test instrument. Preferably, the tabs 2 have positioning holes for aligning the anode plate 101 and the cathode plate 102 with each other when assembling the fuel cell.

As described above, in the fuel cell, the peripheral portions of the repetitive unit 133 are provided with a first group of main pipelines, a second group of main pipelines, and a third group of main pipelines extending in the stacking direction, for supplying the fuel fluid, the oxidizing gas, and the coolant to the respective flow fields of the bipolar plates, respectively. The first through hole 3*a* and the second through hole 3*b* of the anode plate 101 form portions of an inflow path and portions of an outflow path of the first group of main pipelines, respectively. The third through hole 4*a* and the fourth through hole 4*b* form portions of an inflow path and portions of an outflow path of the second group of main pipelines, respectively. The fifth through hole 5*a* and the sixth through hole 5*b* form portions of an inflow path and portions of an outflow path of the third group of main pipelines, respectively.

The first to third groups of main pipelines may have cross-sectional areas (i.e. the cross-sectional area of the corresponding through holes) on the surface of the bipolar plate, which are determined in view of actual design requirements. Preferably, the cross-sectional area of the second group of main pipelines (corresponding to the third through hole 4*a* and the fourth through hole 4*b*) is larger than the cross-sectional area of the first group of main pipelines (corresponding to the first through hole 3*a* and the second through hole 3*b*). For example, the former is 2-6 times larger than the latter. The cross-sectional area of the third group of main pipelines (corresponding to the fifth through hole 5*a* and the sixth through hole 5*b*) can be determined in view of actual design requirements.

The first through hole 3*a* and the second through hole 3*b* of the anode plate 101 have cross sections of the identical shape, i.e. approximately arc-edge trapezoid. Preferably, corners of the arc-edge trapezoid are rounded. A length of the top edge of the arc-edge trapezoid is less than a length of the bottom edge of the arc-edge trapezoid. For example, the length of the top edge is ⅓ to 19/20 of the length of the bottom edge. Near the first edge of the substrate 1, the top edge and the bottom edge of the arc-edge trapezoid are respectively approximately perpendicular to the first edge of the substrate 1, and the first edge of the arc-edge trapezoid is approximately parallel to and close to the first edge of the substrate 1. Near the second edge of the substrate 1, the top edge and the bottom edge of the arc-edge trapezoid are respectively approximately perpendicular to the second edge of the substrate 1, and the first edge of the arc-edge trapezoid is approximately parallel to the second edge of the substrate 1 and close to the second edge of the substrate 1. The second edge of the arc edge trapezoid has an inclined arc shape and is opposite to the first edge. Accordingly, at least portions of the sidewalls of the first through-hole 3a and the second through-hole 3b are concave and circumferential openings are formed on the curved sidewalls on the first surface of the anode plate 101.

For example, a plurality of distributing regions are formed on the first surface of the substrate 1 of the anode plate 101. The plurality of distributing regions are arranged in a row along a longitudinal direction of the substrate 1 (i.e. an extending direction of the first edge and the second edge). The number of distributing regions is, for example, 1 to 20. A width of a single distributing region is, for example, 15 mm to 100 mm. Each distributing region includes a flow-field structure 101b, and flow-guiding structures 101a located on both sides of the flow-field structure 101b. An inlet of the flow-field structure 101b communicates with a circumferential opening of the first through hole 3a via a flow-guiding structure 101a near the first edge of the substrate 1. An outlet of the flow-field structure 101b communicates with a circumferential opening of the second through hole 3b via a flow-guiding structure 101a near the second edge of the substrate 1.

The flow-field structure 101b of the anode plate 101 includes a plurality of flow channels 11 extending from an inlet to an outlet which are separated from each other by ridges 12 for example 25 to 70 in number. In a case that a plurality of distributing regions are formed on the surface of the anode plate 101, the flow-field structures of the plurality of distributing regions may be a plurality of groups of flow channels which are arranged continuously. The plurality of flow channels 11 of the anode plate 101 are open on the first surface, and the fuel fluid is not only transported along the first surface but also to an anode side of the membrane electrode assembly 103 via the opening. The plurality of flow channels 11 may be of any shape of a linear shape, a curved shape and a serpentine shape. As shown in the figure, the flow channels extend along the first edge and perpendicular to the first edge in the embodiment. Preferably, the flow channels of a serpentine shape can increase a length of a flow passage of the fuel fluid, thereby increasing flow resistance of the fuel fluid when passing through the flow field. With the increase of a flow resistance, the distribution of fuel fluid on the anode plate 101 is more uniform. Meanwhile, a concentration of fuel fluid in the plane direction of the membrane electrode assembly is also increased, and an energy loss of electrochemical reaction is reduced.

The flow-field structure 101b of the anode plate 101 is, for example, a dense design of ultra-fine flow channels in which a ridge width of the anode plate 101 is decreased to be between 30 and 500 microns. As the ridge width of the anode plate 101 decreases, the phenomenon of "water flooding" on the anode side of the repetitive unit is significantly suppressed. Meanwhile, the ultra-fine flow channels also shorten a diffusion distance between the fuel fluid and the water because the ridges and the channels are narrow, and increase a concentration of the fuel fluid and the water in the plane direction in the membrane electrode assembly, thus reducing an energy loss of electrochemical reaction. The fuel cell in the present disclosure has better large-current and high-power and continuous discharge capability and better water and heat management capability. The anode plate 101 has conductivity which is related to a ratio of the ridge width to the channel width. If the ratio is too small, the current will be difficult to be conducted, thus reducing an overall efficiency of the fuel cell. In this disclosure, the ratio of ridge width to channel width in the flow-field structure of the anode plate 101 is approximately 1:1. The channel width of the anode plate 101 is between 30 and 500 microns, corresponding to the ridge width of the anode plate 101. Further, to ensure an effect of gas transport, a length of the ultra-fine flow field of the anode plate 101 is between 20 and 150 mm. If the length of ultra-fine flow field is too long, a flow resistance of the fuel fluid in the flow field will be too large. Meanwhile, the longer a distance of the coolant flowing on the second surface of the anode plate 101, the greater a flow resistance of the coolant, and a higher power water pump or air compressor is needed to overcome a flow resistance of the coolant, which increases the cost of the system and affecting the overall efficiency of the system.

The flow-guiding structure 101a of the anode plate 101 includes a plurality of grooves 13 which extend from the circumferential opening of the first through hole 3a or the second through hole 3b to the inlet or outlet of the flow-field structure 101b and are arranged radially. The plurality of grooves 13 are separated from each other by spacers 14, for example, the number of which is 2 to 10. On the first surface of the anode plate 101, one end of a spacer 14 of the flow-guiding structure 101a may extend to an edge of the first through hole 3a or the second through hole 3b, the other end of the spacer 14 of the flow-guiding structure 101a may extend to an edge of the flow-field structure 101b, or even be directly connected to a ridge 12 of the flow-field structure 101b, or may be separated from an edge of the flow-field structure 101b by a certain distance.

In a case that a plurality of distributing regions are formed on the surface of the anode plate 101, flow-guiding structures of the plurality of distributing regions may include a plurality of groups of grooves separated from each other. The plural grooves 13 of the anode plate 101 are open on the first surface, and may be closed by, for example, an additional gasket, so that the grooves form flow-guiding channels which are close at the top surface. The gasket prevents the grooves from being blocked by a rim of the membrane electrode assembly which is deformed by pressure when the fuel cell is assembled and pressed. As mentioned above, the circumferential opening of the first through hole 3a or the second through hole 3b is a circumferential opening in the curved sidewall. This design allows maximizing a width of the circumferential opening in a case that a width of the first through hole 3a or the second through hole 3b is limited, so as to reduce a flow resistance of the fuel fluid from the first through hole 3a or the second through hole 3b of the anode plate 101 into the flow-guiding structure 101a and to make the flow of the fuel fluid smoother. In the flow-guiding structures 101a, cross-sectional areas of the plurality of grooves 13 of the anode plate 101 in an inflow path of the fuel fluid gradually become larger to reduce a flow resistance of the fuel fluid inflow flow-field structure 101b, and cross-sectional areas in an outflow path of the fuel fluid gradually become smaller to increase a flow resistance of the fuel fluid outflow flow-field structure 101b.

In a preferred embodiment a plurality of cooling regions are formed, for example, on the second surface of the substrate 1 of the anode plate 101.

Each of the fifth through hole 5a and the sixth through hole 5b of the anode plate 101 has a cross section of an approximately-rectangular shape. Near the first edge of the substrate 1, a first edge and a second edge of the rectangle are opposite to each other and are respectively substantially perpendicular to the first edge of the substrate 1, and a third edge and a fourth edge are opposite to each other and are respectively substantially parallel to the first edge of the substrate 1. Accordingly, sidewalls of the fifth through hole 5a and the sixth through hole 5b are flat, and straight circumferential openings are formed on the second surface of the anode plate 101.

A plurality of cooling regions of the anode plate 101 are arranged in a row along a longitudinal direction of the substrate 1 (i.e. an extending direction of the first edge and the second edge), and each cooling region includes a flow-field structure 101d and flow-guiding structures 101c on both sides thereof of the flow-field structure 101d. An inlet of the flow-field structure 101d communicates with the circumferential opening of the fifth through hole 5a via a flow-guiding structure 101c near the first edge of the substrate 1, and an outlet of the flow-field structure 101d communicates with the circumferential opening of the sixth through hole 5b via a flow-guiding structure 101c near the second edge of the substrate 1.

The flow-field structure 101d of the coolant on the second surface of the anode plate 101 includes a plurality of flow channels 15 separated from each other by ridges 16. The flow-guiding structure of coolant 101c of the anode plate 101 includes a plurality of flow-guiding grooves 17 separated from each other by spacers 18. The plurality of flow-guiding grooves 17, for example, have a linear shape extending perpendicular to the direction of the first edge of the substrate 1. The plurality of flow channels 15, for example, have a zigzag shape, including a plurality of portions continuously extending in the direction parallel to and perpendicular to the first edge of the substrate 1. The plurality of flow-guiding grooves 17 and the plurality of flow channels 15 form a plurality of open grooves continuously extending from the circumferential opening of the fifth through hole 5a near the first edge of the substrate 1 to the circumferential opening of the sixth through hole 5b near the second edge of the substrate 1, the number of which is, for example, 4 to 12. For example, the open grooves may be closed with a second surface of the cathode plate of an adjacent repetitive unit, or with a current collector or an insulating plate or an terminal plate, thereby forming closed cooling passages.

The flow-field structure on the second surface of the anode plate 101 includes zigzag-shaped flow channels, which mainly reduce a flow speed of the coolant and increases a flow passage length of the coolant to take away more heat and improve an cooling effect. The fuel cell with this design has excellent hydrothermal management ability. When water is used as coolant, a temperature difference between an inlet and an outlet of the cooling water of the anode plate can be controlled within 10° C.

The anode plate according to the second embodiment has the functions of distributing fuel fluid, conducting electrons, dissipating heat and being as a supporting plate. The first surface of the anode plate includes an ultra-fine flow-field structure and flow-guiding structures for supplying the fuel fluid. Each of the flow-guiding structures include a plurality of grooves being arranged radially. Circumferential openings are formed as being inclined on the curved sidewalls of the first through hole and the second through hole from which fuel fluid flows into and out of the flow-guiding structure, thereby maximizing the width of the circumferential opening in a case that the width of the through hole is limited. The flow-guiding structures on the first surface of the anode plate are designed such that a flow resistance of the fuel fluid is different at an inlet and an outlet of the flow passage, so that the distribution of the fuel fluid on the anode plate is more uniform. Meanwhile, a concentration of the fuel fluid in a plane direction of the membrane electrode assembly is also increased, and an energy loss of electrochemical reaction is reduced. Therefore, the fuel cell using the anode plate can improve the area-specific power.

In a preferred embodiment, where a plurality of distributing regions are formed on the surface of the anode plate, each distributing region has a respective flow-field structure, and a pair of through holes and a pair of flow-guiding structures separated from each other. When the number of the distributing regions and the number of anode plates are increased, uniform distribution of fluid among the distributing regions of each plate and among different plates can still be ensured. This design enables an increase or a decrease of an active area by flexibly setting the number of distributing regions on the anode plate according to power requirements of the fuel cell. Further, the flow-guiding structures of the plurality of distributing regions of the anode plate includes a plurality of groups of flow-guiding grooves which are separated from each other. Due the plurality of groups of flow-guiding grooves, even in a case that some distributing regions of the anode plate are damaged or flow of a reactant is blocked due to failure of the some distributing regions, other distributing regions of the anode plate can still maintain normal operation, only with decrease of an overall output power of the fuel cell stack. Therefore, the fuel cell using the anode plate can be manufactured in modules in a flexible manner and with improved reliability.

In a preferred embodiment, a second surface of the anode plate includes a flow-field structure and flow-guiding structures of a coolant to effectively carry away heat generated by the electrochemical reaction, so that the anode plate also is used as a heat dissipation plate. The flow field of the coolant on the second surface of the anode plate includes flow channels of a zigzag shape to increase a passage length and to improve a cooling effect. The anode plate can improve the flow uniformity and water and heat management of the fuel cell, thus improving the high-current discharge performance and the power density of the fuel cell.

Third Embodiment

Figure 4:
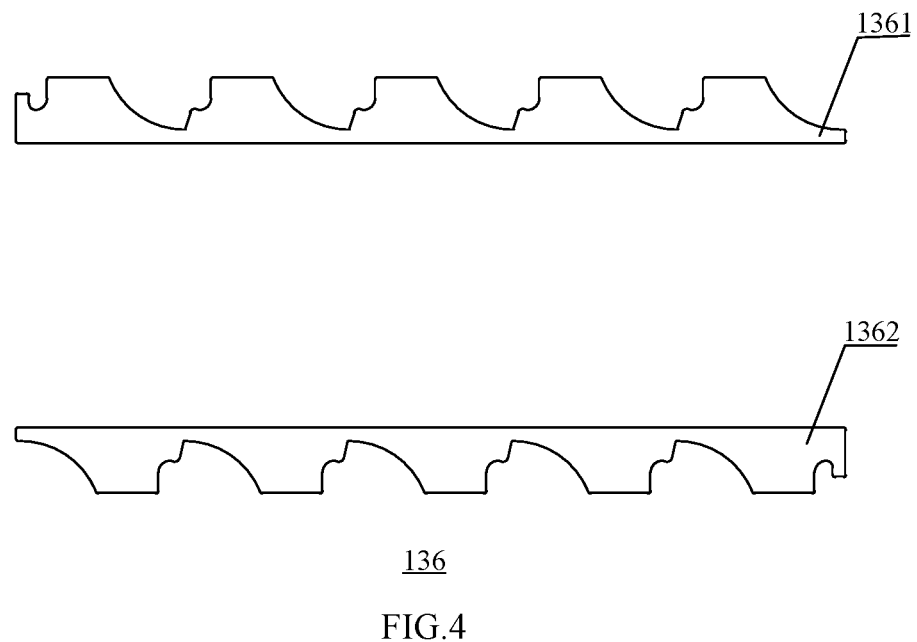
FIG. 4 shows a top view of a gasket above first surface of an anode plate in an anode plate assembly according to a third embodiment of the present disclosure.
Figure 5:
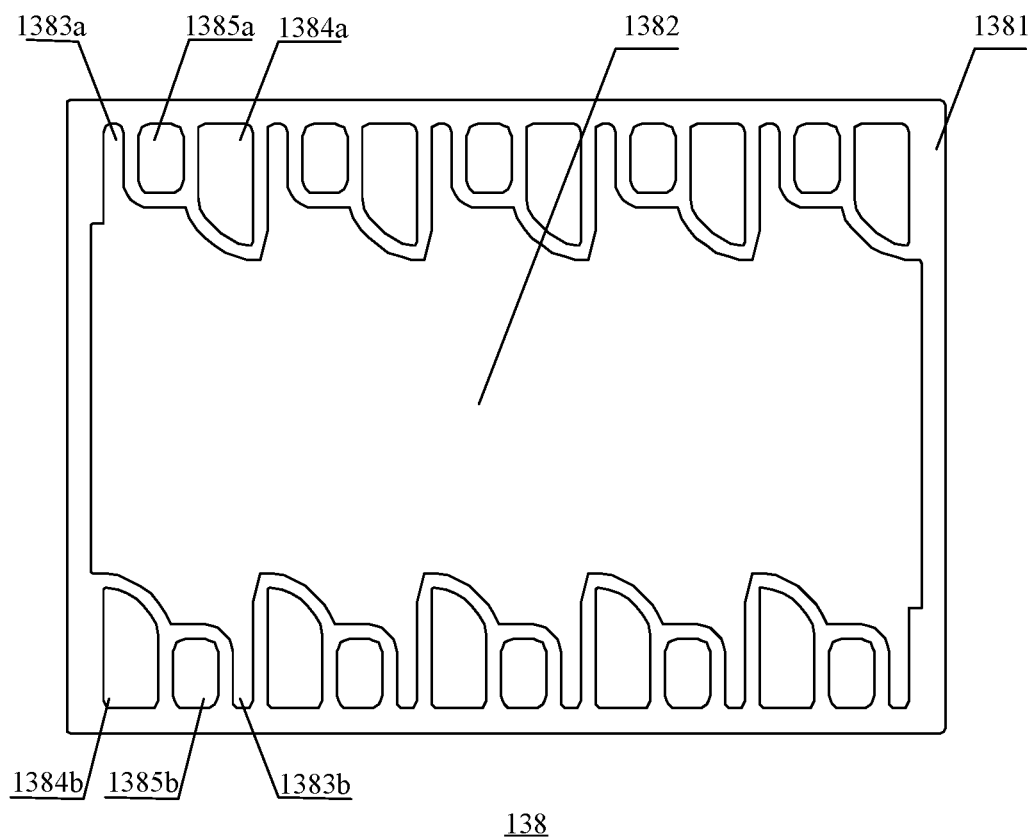
FIG. 5 shows a top view of a sealing frame on a first surface of an anode plate in an anode plate assembly according to a third embodiment of the present disclosure.
Figure 12:
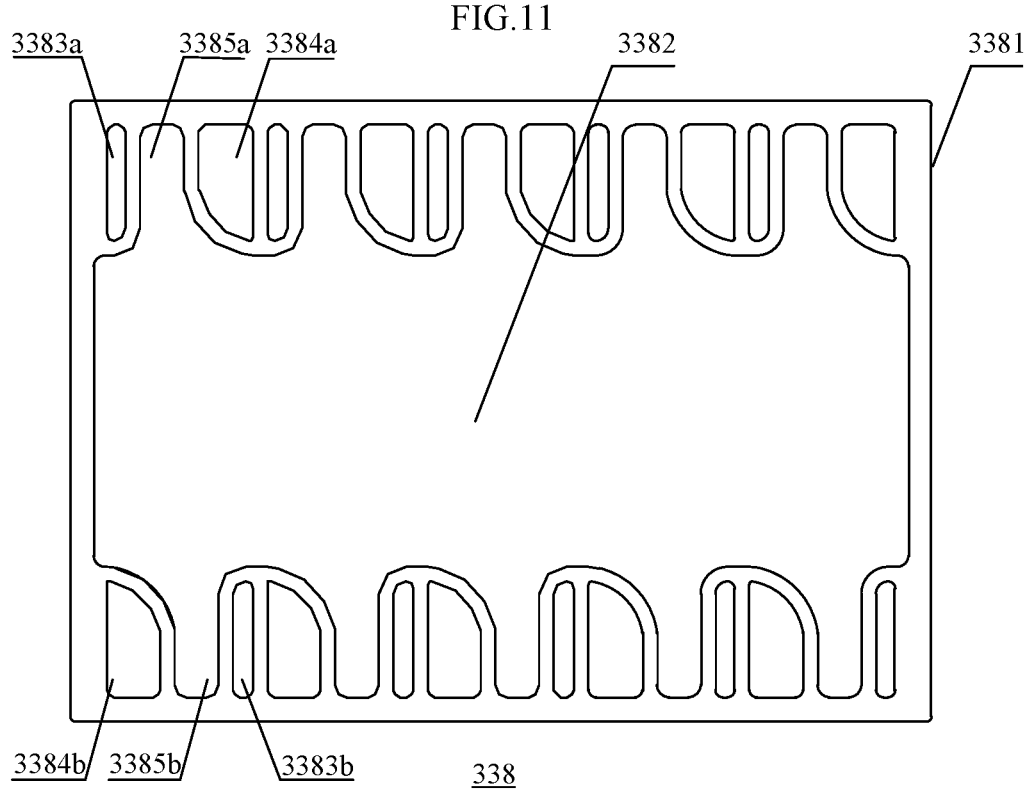
FIG. 12 shows a top view of a second sealing frame in an anode plate assembly according to the third embodiment and a cathode plate assembly according to the fifth embodiment of the present disclosure.

An anode plate assembly according to a third embodiment includes an anode plate, a gasket and a sealing frame located on a first surface of the anode plate, and a sealing frame located on a second surface of the anode plate. The anode plate is, for example, the one described in detail above in connection with the second embodiment. For the sake of simplicity, an internal structure of the anode plate will not be described in detail below. In FIGS. 4 and 5, and FIG. 12, only top views of a gasket on a first surface of the anode plate, a sealing frame on the first surface of the anode plate, and a sealing frame on a second surface of the anode plate in the anode plate assembly are shown.

As shown in FIG. 4, the gasket 136 in the anode plate assembly includes a first sub-sheet 1361 and a second sub-sheet 1362. Near a first edge of the substrate of the anode plate 101, the first sub-sheet 1361 covers a top surface of the flow-guiding structure at the inlet of the first surface of the anode plate 101. Near a second edge of the substrate of the anode plate 101, the second sub-sheet 1362 covers a top surface of the flow-guiding structure at the outlet of the first surface of the anode plate 101. The first sub-sheet 1361 and the second sub-sheet 1362 have shapes that corresponding to the top surface of the flow-guiding structure of the first surface of the anode plate 101 such that the upper portion of the flow-guiding grooves of the first surface of the anode plate 101 are closed to form flow-guiding channels.

The gasket 136 is used for closing the top surface of the flow-guiding structure of the fuel fluid to prevent the flow-guiding grooves from being blocked by a rim of the membrane electrode assembly which is deformed by pressure when the fuel cell is assembled and pressed. The gasket 136 may be made of a material having high mechanical strength and good temperature stability, such as graphite, stainless steel, titanium alloy, aluminum alloy copper alloy, and the like.

As shown in FIG. 5, the sealing frame 138 of the first surface of the anode plate in the anode plate assembly includes a rim frame 1381 and a central opening 1382 surrounded by the rim frame 1381. Near a first edge of the frame 1381, a plurality of groups of through holes are formed and arranged in a row, and each group of through holes includes a first through hole 1383$a$, a fifth through hole 1385$a$, and a third through hole 1384$a$ arranged in sequence. Near a second edge of the frame 1381, a plurality of groups of through holes are formed and arranged in a row, and each group of through holes includes a fourth through hole 1384$b$, a sixth through hole 1385$b$, and a second through hole 1383$b$ arranged in sequence. In the anode plate assembly, a rim frame 1381 of a sealing frame 138 contacts a peripheral portion of the anode plate, and the first to sixth through holes of the sealing frame 138 are aligned with the first to sixth through holes of the anode plate 101, respectively, thereby forming portions of an inflow passage and an outflow passage of the first, second and third main pipelines. The central opening of the sealing frame 138 exposes the ultra-fine flow-field structure of the anode plate 101. The central opening 1382 of the sealing frame 138 is separated from the third and fourth through holes, and the fifth and sixth through holes, so that the oxidizing gas and the coolant cannot reach the ultra-fine flow-field structure of the anode plate 101. The central opening 1382 of the sealing frame 138 is in communication with the first and second through holes, and the circumferential openings of the first and second through holes of the anode plate 101 are in communication with the flow-guiding structures of the fuel fluid, such that only the fuel fluid reaches the ultra-fine flow-field structure of the anode plate 101 via the flow-guiding structures.

In this embodiment, the sealing frame 138 in the anode plate assembly may be made of a pre-formed sealing frame, or may be a glue strip which is formed by gluing and curing on the first surface of the anode plate 101.

As shown in FIG. 12, a sealing frame 338 on a second surface of the anode plate in the anode plate assembly includes a rim frame 3381 and a central opening 3382 surrounded by the rim frame 3381. Near a first edge of the frame 3381, a plurality of groups of through holes are formed and arranged in a row, and each group of through holes includes a first through hole 3383$a$, a fifth through hole 3385$a$, and a third through hole 3384$a$ arranged in sequence. Near a second edge of the frame 3381, a plurality of groups of through holes are formed and arranged in a row, and each group of through holes includes a fourth through hole 3384$b$, a sixth through hole 3385$b$, and a second through hole 3383$b$ arranged in sequence. In the anode plate assembly, the rim frame 3381 of the sealing frame 338 contacts a peripheral portion of the anode plate, and the first to sixth through holes of the sealing frame 338 are respectively aligned with the first to sixth through holes of the anode plate 101, thereby forming portions of an inflow passage and an outflow passage of the first, second and third main pipelines. The central opening of the sealing frame 338 exposes a flow-field structure of the coolant of the anode plate 101. The central opening 3382 of the sealing frame 338 is separated from the first and second through holes and the third and fourth through holes so that the fuel fluid and the oxidizing gas cannot reach the flow-field structure of a coolant of the anode plate 101. The central opening 3382 of the sealing frame 338 is in communication with the fifth and sixth through holes, and circumferential openings of the fifth and sixth through holes of the anode plate 101 are in communication with the flow-guiding structures of the coolant, so that only the coolant reaches the ultra-fine flow-field structure of the anode plate 101 via the flow-guiding structures.

In this embodiment, the sealing frame 338 in the anode plate assembly may be made of a pre-formed sealing frame, or may be a glue strip which is formed by gluing and curing on the second surface of the anode plate 101.

In the anode plate assembly according to of the third embodiment, on the first surface of the anode plate, the fuel fluid, the oxidizing gas, and the coolant are respectively sealed with a sealing frame on the surface of the anode plate 101, and the top surface of the flow-guiding structure of the fuel fluid is sealed with a gasket to form a flow-guiding channel. Because the sealing frame has the function of separating the third and fourth through holes and the fifth and sixth through holes from the flow-guiding structure and the ultra-fine flow-field structure on the first surface of the anode plate, only the fuel fluid reaches the ultra-fine flow-field structure on the first surface of the anode plate via the circumferential openings of the first and second through holes and the closed flow-guiding channel. The ultra-fine flow-field structure at a central portion of the anode plate is directly exposed to the first surface of the membrane electrode assembly, so that the fuel fluid can be supplied to a cathode side of the membrane electrode assembly via the flow channel surface. In this embodiment, the sealing frame has the functions of preventing leakage of the reactant and the coolant from the surface of the anode plate to the outside of the fuel cell (i.e. external leakage), but also to prevent leakage between the reactant and the coolant (i.e. inner leakage). Even in a case that an internal temperature of the fuel cell rises, the sealing frame in the anode plate assembly can complement distance variations between the anode plate and the membrane electrode assembly to maintain sealing performance. Therefore, the fuel cell using the anode plate assembly according to the third embodiment or similar anode plate assembly can improve the stability of continuous high-current discharge.

Fourth Embodiment

Figure 6A:
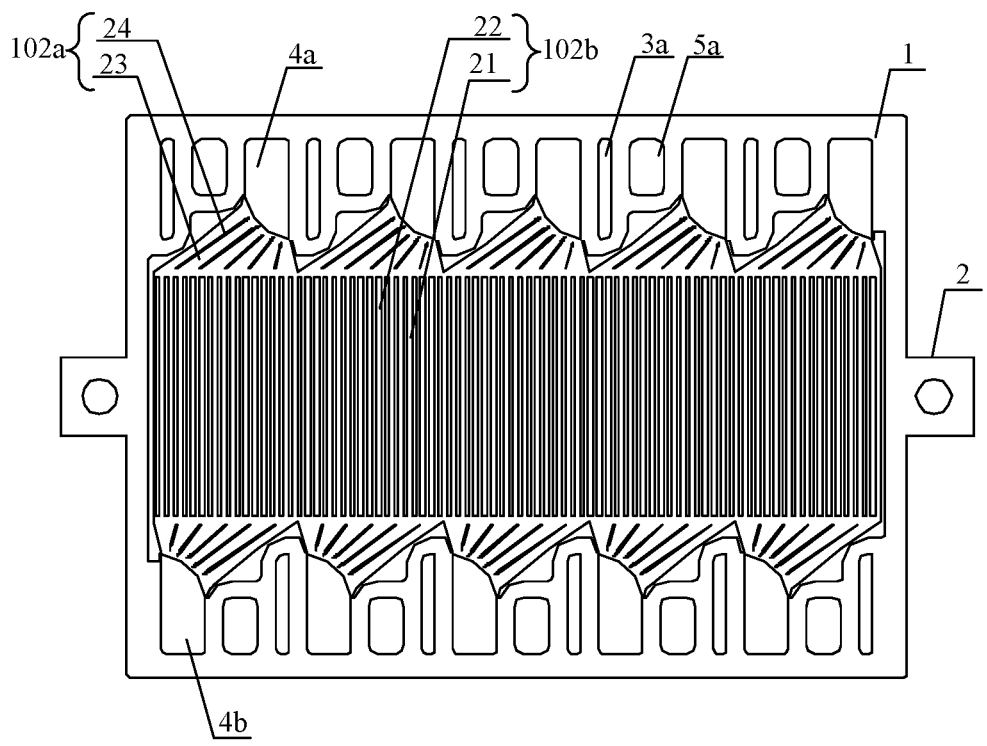
FIGS. 6a and 6b respectively show a top view and a bottom view of a cathode plate according to a fourth embodiment of the present disclosure.
Figure 6B:
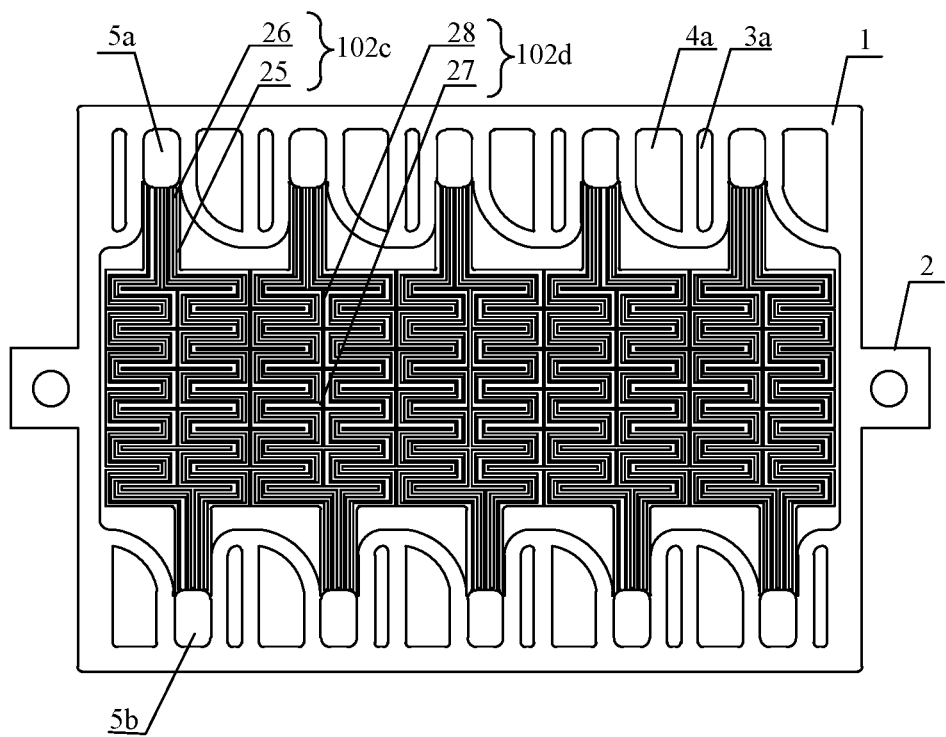

FIGS. 6$a$ and 6$b$ respectively show a top view and a bottom view of a cathode plate according to a fourth embodiment of the present disclosure, wherein the view viewed from below the fuel cell is a bottom view and the view viewed from above the fuel cell is a top view.

Figure 10:
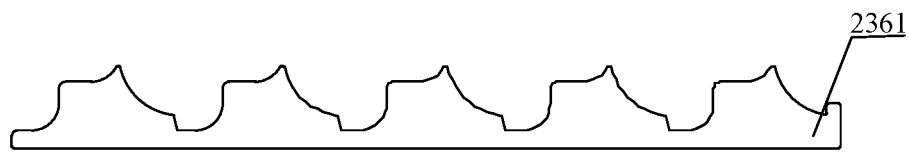
FIG. 10 shows a top view of a gasket above first surface of a cathode plate in a cathode plate assembly according to a fifth embodiment of the present disclosure.
Figure 10:
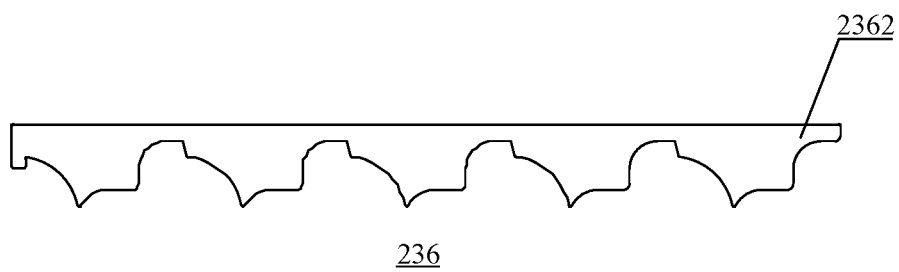
Figure 11:
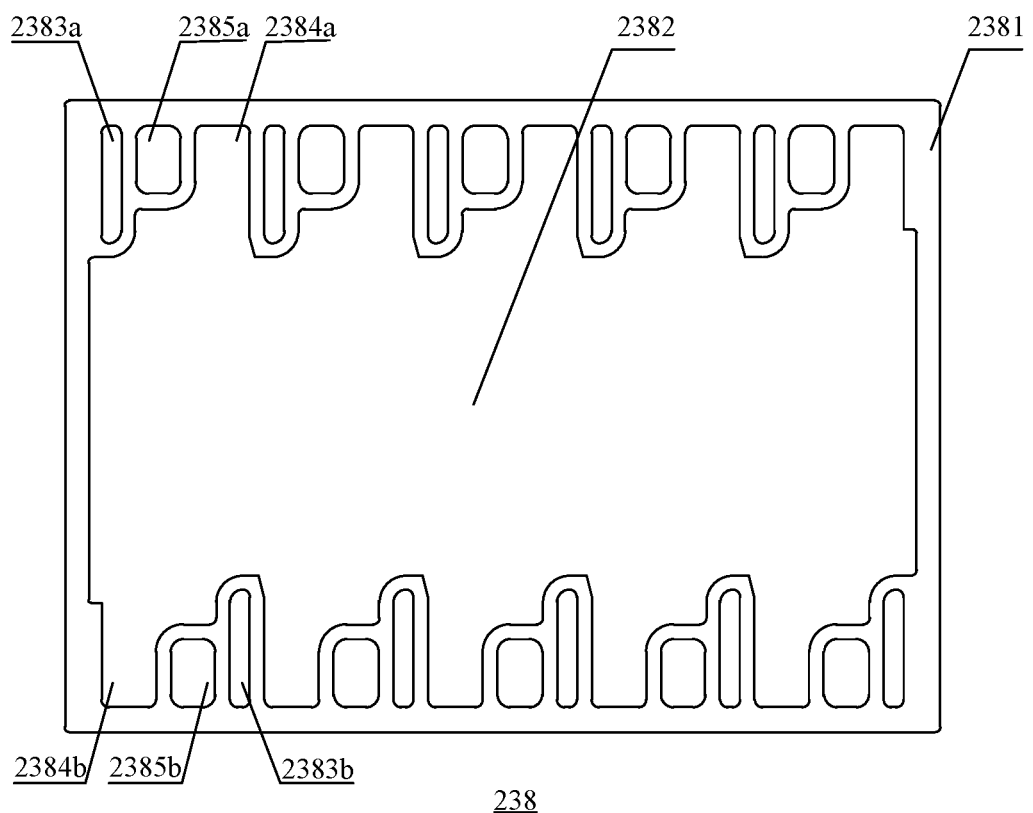
FIG. 11 shows a top view of a sealing frame on a first surface of a cathode plate in a cathode plate assembly according to a fifth embodiment of the present disclosure.

FIGS. 10 to 12 respectively show three-dimensional structural diagrams of different examples of a cathode plate according to a fourth embodiment of the present disclosure.

The cathode plate 102 includes a substrate 1 and a flow-guiding structure 102$a$ and a flow-field structure 102$b$ for transferring an oxidizing gas on a first surface of the substrate 1, and a flow-guiding structure 102$c$ and a flow-field structure 102$d$ for transferring a coolant on a second surface of the substrate 1. The cathode plate 102 has the functions of distributing oxidizing gas and conducting electrons, and may be made of a material having high mechanical strength and excellent electrical conductivity, such as graphite, stainless steel, titanium alloy, aluminum alloy, copper alloy, etc.

The substrate 1 has an approximately-rectangular shape and includes first and second edges opposite to each other and third and fourth edges opposite to each other. A plurality of groups of through holes are formed and arranged in a row near the first edge of the substrate 1, and each group of through holes includes a first through hole 3a, a fifth through hole 5a, and a third through hole 4a arranged in sequence. A plurality of groups of through holes are formed and arranged in a row near the second edge of the substrate 1, and each group of through holes includes a fourth through hole 4b, a sixth through hole 5b, and a second through hole 3b arranged in sequence. Tabs 2 are formed on the third side and the fourth edge of the substrate 1, respectively. The tabs 2 are used as detection terminals when being connected with a test instrument. Preferably, the tabs 2 have positioning holes for aligning the anode plate 101 and the cathode plate 102 with each other when assembling the fuel cell.

As described above, in the fuel cell, the peripheral portions of the repetitive unit 133 are provided with a first group of main pipelines, a second group of main pipelines, and a third group of main pipelines extending in the stacking direction for supplying fuel fluid, oxidizing gas, and coolant to respective flow fields in the bipolar plates, respectively. The first through hole 3a and the second through hole 3b of the cathode plate 102 form portions of an inflow path and portions of an outflow path of the first group of main pipelines, respectively. The third through hole 4a and the fourth through hole 4b form portions of an inflow path and portions of an outflow path of the second group of main pipelines, respectively. The fifth through hole 5a and the sixth through hole 5b form portions of an inflow path and an outflow path of the third group of main pipelines, respectively.

The first to third groups of main pipelines may have cross-sectional areas (i.e. the cross-sectional area of the corresponding through holes) on the surface of the bipolar plate, which are determined in view of actual design requirements. Preferably, the cross-sectional area of the second group of main pipelines (corresponding to the third through hole 4a and the fourth through hole 4b) is larger than the cross-sectional area of the first group of main pipelines (corresponding to the first through hole 3a and the second through hole 3b). For example, the former is 2-6 times larger than the latter. The cross-sectional area of the third group of main pipelines (corresponding to the fifth through hole 5a and the sixth through hole 5b) can be determined in view of actual design requirements.

The cross-sectional shapes of the third through-hole 4a and the fourth through-hole 4b of the cathode plate 102 have cross sections of the identical shape, i.e. approximately arc-edge trapezoid. Preferably, corners of the arc-edge trapezoid are rounded. The length of the top edge of an arc-edge trapezoid is less than the length of the bottom edge. For example, the length of the top edge is ⅙ to ⅚ of the length of the bottom edge. Near the first edge of the substrate 1, the top edge and the bottom edge of the arc edge trapezoid are respectively approximately perpendicular to the first edge of the substrate 1, the first edge of the arc-edge trapezoid is approximately parallel to and close to the first edge of the substrate 1. Near the second edge of the substrate 1, the top edge and the bottom edge of the arc-edge trapezoid are respectively approximately perpendicular to the second edge of the substrate 1, and the first edge of the arc-edge trapezoid is approximately parallel to and close to the second edge of the substrate 1. The second edge of the arc edge trapezoid has an inclined arc shape and is opposite to the first edge. Accordingly, at least portions of the sidewalls of the third through hole 4a and the fourth through hole 4b are concave and circumferential openings are formed on the curved sidewalls on the first surface of the cathode plate 102.

For example, a plurality of distributing regions are formed on the first surface of the substrate 1 of the cathode plate 102. The plurality of distributing regions are arranged in a row along a longitudinal direction of the substrate 1 (i.e. an extending direction of the first edge and the second edge). The number of distributing regions is, for example, 1 to 20. A width of a single distributing region is, for example, 15 to 100 millimeters. Each distributing region includes a flow-field structure 102b, and flow-guiding structures 102a located on both sides of the flow-field structure 102b. An inlet of the flow-field structure 102b communicates with a circumferential opening of the third through hole 4a via a flow-guiding structure 102a near the first edge of the substrate 1. An outlet of the flow-field structure 102b communicates with a circumferential opening of the fourth through hole 4b via a flow-guiding structure 102a near the second edge of the substrate 1.

The flow-field structure 102b of the cathode plate 102 includes a plurality of flow channels 21 extending from an inlet to an outlet separated from each other by ridges 22 for example 25 to 70. In a case that a plurality of distributing regions are formed on the surface of the cathode plate 102, the flow-field structures of the plurality of distributing regions may be a plurality of groups of flow channels which are arranged continuously. The plurality of flow channels 21 of the cathode plate 102 are open on the first surface, and the oxidizing gas is not only transported along the first surface but also to the cathode side of the membrane electrode assembly 103 through the opening. The plurality of flow channels 21 may be of any shape of a linear shape, a curved shape and a serpentine shape. As shown in the figure, the flow channels extend along the first edge and perpendicular to the first edge in the embodiment. Preferably, the flow channels of a linear shape can reduce flow resistance of the oxidizing gas when passing through the flow field, so that the oxidizing gas is more uniformly distributed over the cathode plate 102. Meanwhile, a concentration of oxidizing gas in the plane direction of the membrane electrode assembly is also increased, and an energy loss of electrochemical reaction is reduced. In the embodiment shown in the figure, a linear flow channel extending in a direction perpendicular to the first edge is shown.

The flow-field structure 102b of the cathode plate 102 is, for example, an ultra-fine flow channel design in which a ridge width of the cathode plate 102 is decreased to be between 30 and 500 microns. As the ridge width of the cathode plate 102 decreases, the phenomenon of "water flooding" on the cathode side of the repetitive unit is significantly suppressed. Meanwhile, the ultra-fine flow channels also shorten a diffusion distance between the oxidizing gas and the water because the ridges and the channels are narrow, and increase a concentration of the oxidizing gas and the water in the plane direction in the membrane electrode assembly, thus reducing an energy loss of electrochemical reaction. The fuel cell in the present disclosure has better large-current and high-power and continuous discharge capability and better water and heat management capability. The cathode plate 102 has conductivity which is related to a ratio of ridge width to channel width. If the ratio is too small, the current will be difficult to be conducted, thus reducing an overall efficiency of the fuel cell. In this disclosure, the ratio of ridge width to channel width in the flow-field structure of the cathode plate 102 is approximately 1:1. The channel width of the cathode plate 102 is between 30 and 500 microns, corresponding to the ridge width of the cathode plate 102. Further, to ensure an effect of gas transport, a length of the ultra-fine flow field of the cathode plate 102 is between 20 and 150 millimeters. If the length of ultra-fine flow field is too long, a flow resistance of the oxidizing gas in the flow field will be too large, a higher power air compressor is required to overcome a flow resistance of the oxidizing gas. Thus, a higher power water pump or air compressor is also required for the coolant flowing on the second surface of the cathode plate 102 to overcome a flow resistance of the coolant, which increases the cost of the system and affecting the overall efficiency of the system.

The flow-guiding structure 102a of the cathode plate 102 includes a plurality of grooves 23 extending from the third through hole 4a or the fourth through hole 4b to the inlet or outlet of the flow-field structure 102b and arranged radially. The plurality of grooves 23 are separated from each other by spacers 24, the number of which is, for example, 2 to 10. On the first surface of the cathode plate 102, one end of a spacer 24 of the flow-guiding structure 102a may extend to an edge of the third through hole 4a or the fourth through hole 4b, the other end of the spacer 24 of the flow-guiding structure 102a may extend to an edge of the flow-field structure 102b, or even be directly connected to a ridge 22 of the flow-field structure 102b, or may be spaced from an edge of the flow-field structure 102b.

In a case that a plurality of distributing regions are formed on the surface of the cathode plate 102 flow-guiding structures of the plurality of distributing regions may include a plurality of groups of grooves separated from each other. The plurality of grooves 23 of the cathode plate 102 are open on the first surface and may be closed by, for example, an additional gasket so that the grooves form flow-guiding channels which are close. The gasket prevents the grooves from being blocked by a rim of the membrane electrode assembly which is deformed by pressure when the fuel cell is assembled and pressed. As mentioned above, the third through hole 4a or the fourth through hole 4b is a circumferential opening in the curved sidewall. This design allows a width of the circumferential opening to be maximized in a case that a width of the third through hole 4a or the fourth through hole 4b is limited, so as to reduce a flow resistance of the oxidizing gas from the third through hole 4a or the fourth through hole 4b of the cathode plate 102 into the flow-guiding structure 102a and to make the flow of the oxidizing gas smoother. In the flow-guiding structure 102a, cross-sectional areas of the plurality of grooves 23 of the cathode plate 102 in an inflow path of the oxidizing gas gradually become larger to reduce a flow resistance of the oxidizing gas inflow flow-field structure 102b, and cross-sectional areas in an outflow path of the oxidizing gas gradually become smaller to increase a flow resistance of the oxidizing gas outflow flow-field structure 102b.

In a preferred embodiment a plurality of cooling regions are formed, for example, on the second surface of the substrate 1 of the cathode plate 102.

Each of the fifth through hole 5a and the sixth through hole 5b of the cathode plate 102 has a cross section of an approximately-rectangular shape. Near the first edge of the substrate 1, a first edge and a second edge of the rectangle are opposite to each other and are respectively substantially perpendicular to the first edge of the substrate 1, and a third edge and a fourth edge are opposite to each other and are respectively substantially parallel to the first edge of the substrate 1. Accordingly, sidewalls of the fifth through hole 5a and the sixth through hole 5b are flat, and straight circumferential openings are formed on the second surface of the cathode plate 102.

A plurality of cooling regions of the cathode plate 102 are arranged in a row along a longitudinal direction of the substrate 1 (i.e. an extending direction of the first edge and the second edge), and each cooling region includes a flow-field structure 102d and flow-guiding structures 102c on both sides thereof of the flow-field structure 102d. An inlet of the flow-field structure 102d communicates with the circumferential opening of the fifth through hole 5a via a flow-guiding structure 102c near the first edge of the substrate 1, and an outlet of the flow-field structure 102d communicates with the circumferential opening of the sixth through hole 5b via a flow-guiding structure 102c near the second edge of the substrate 1.

The flow-field structure 102d of the coolant on the second surface of the cathode plate 102 includes a plurality of flow channels 25 separated from each other by ridges 26. The flow-guiding structure of coolant 102c of the cathode plate 102 includes a plurality of flow-guiding grooves 27 separated from each other by spacers 28. The plurality of flow-guiding grooves 27, for example, have a linear shape extending perpendicular to the direction of the first edge of the substrate 1. The plurality of flow channels 25, for example, have a zigzag shape, including a plurality of portions continuously extending in the direction parallel to and perpendicular to the first edge of the substrate 1. The plurality of flow-guiding grooves 27 and the plurality of flow channels 25 form a plurality of open grooves continuously extending from the circumferential opening of the fifth through hole 5a near the first edge of the substrate 1 to the circumferential opening of the sixth through hole 5b near the second edge of the substrate 1, the number of which is, for example, 4 to 12. For example, the open grooves may be closed with a second surface of the cathode plate of an adjacent repetitive unit, or with a current collector or an insulating plate or an terminal plate, thereby forming closed cooling passages.

The flow-field structure on the second surface of the cathode plate 102 includes zigzag-shaped flow channels, which mainly reduce a flow speed of the coolant and increases a flow passage length of the coolant to take away more heat and improve an cooling effect. The fuel cell with this design has excellent hydrothermal management ability. When water is used as coolant, a temperature difference between an inlet and an outlet of the cooling water of the cathode plate can be controlled within 10° C.

Figure 7:
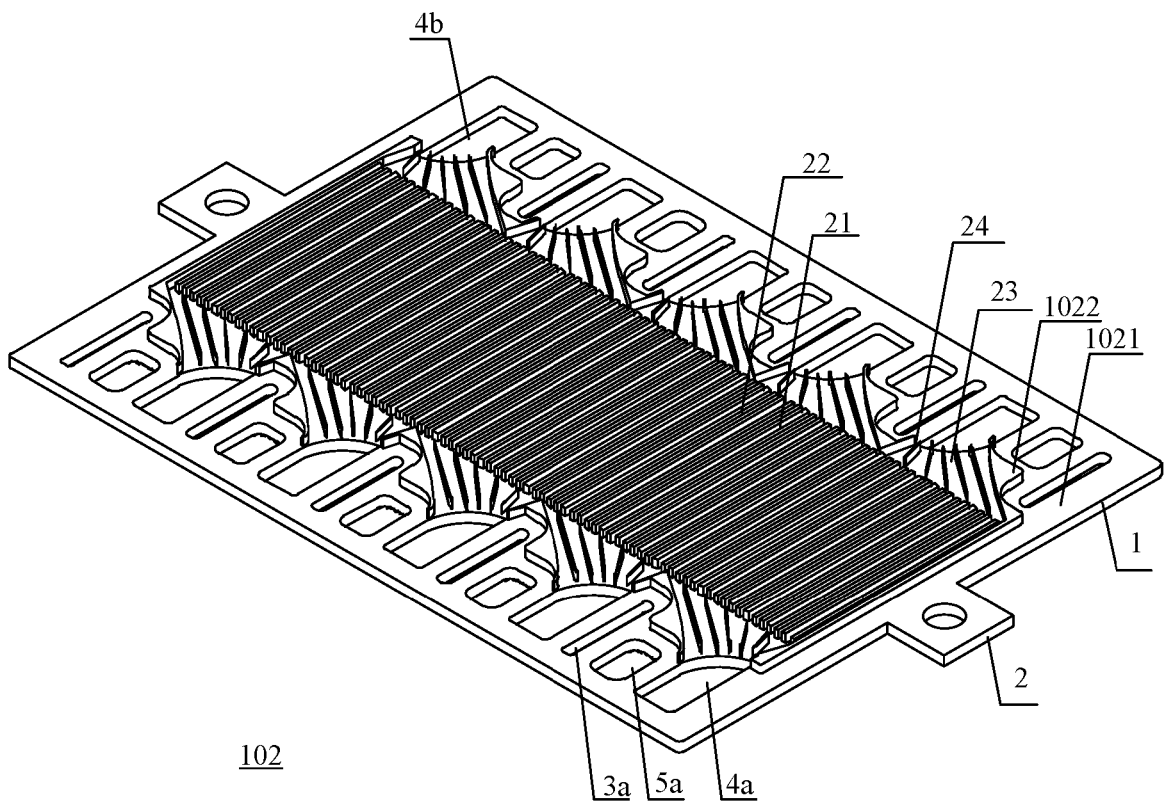
FIGS. 7 to 9 respectively show three-dimensional structural diagrams of different examples of a cathode plate according to a fourth embodiment of the present disclosure.
Figure 8:
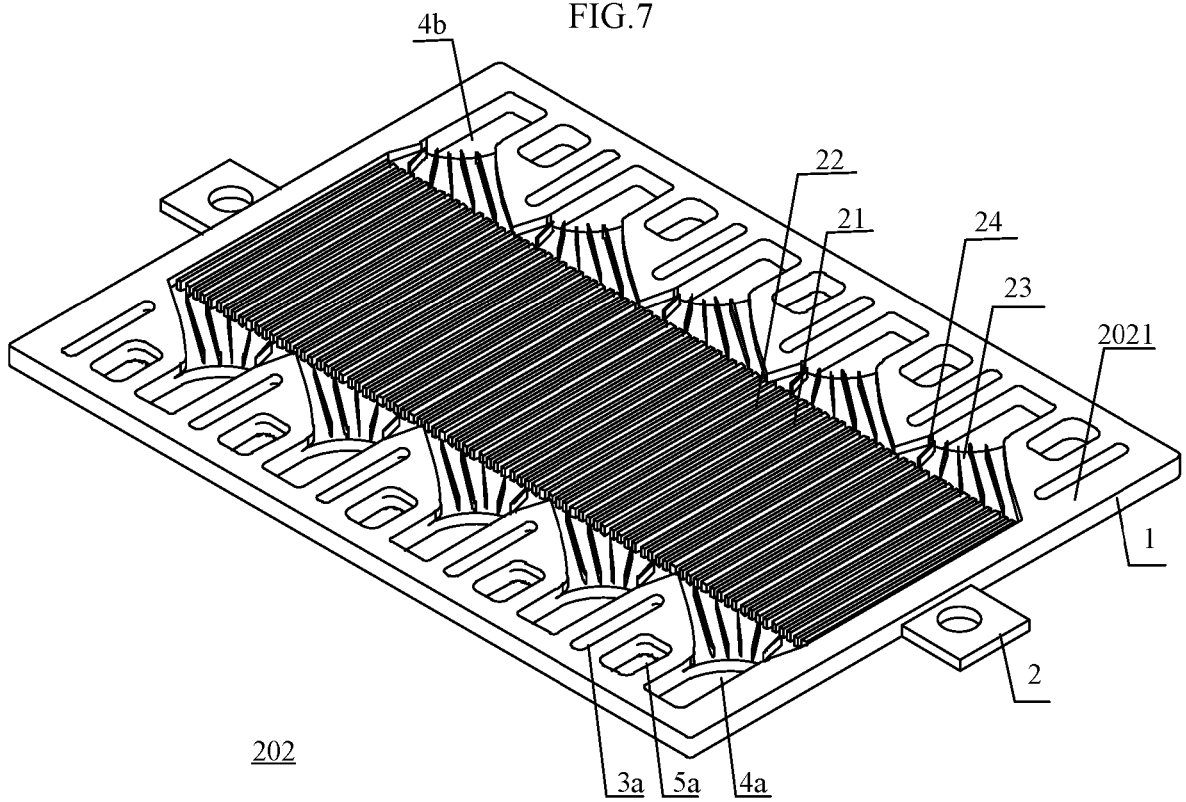
Figure 9:
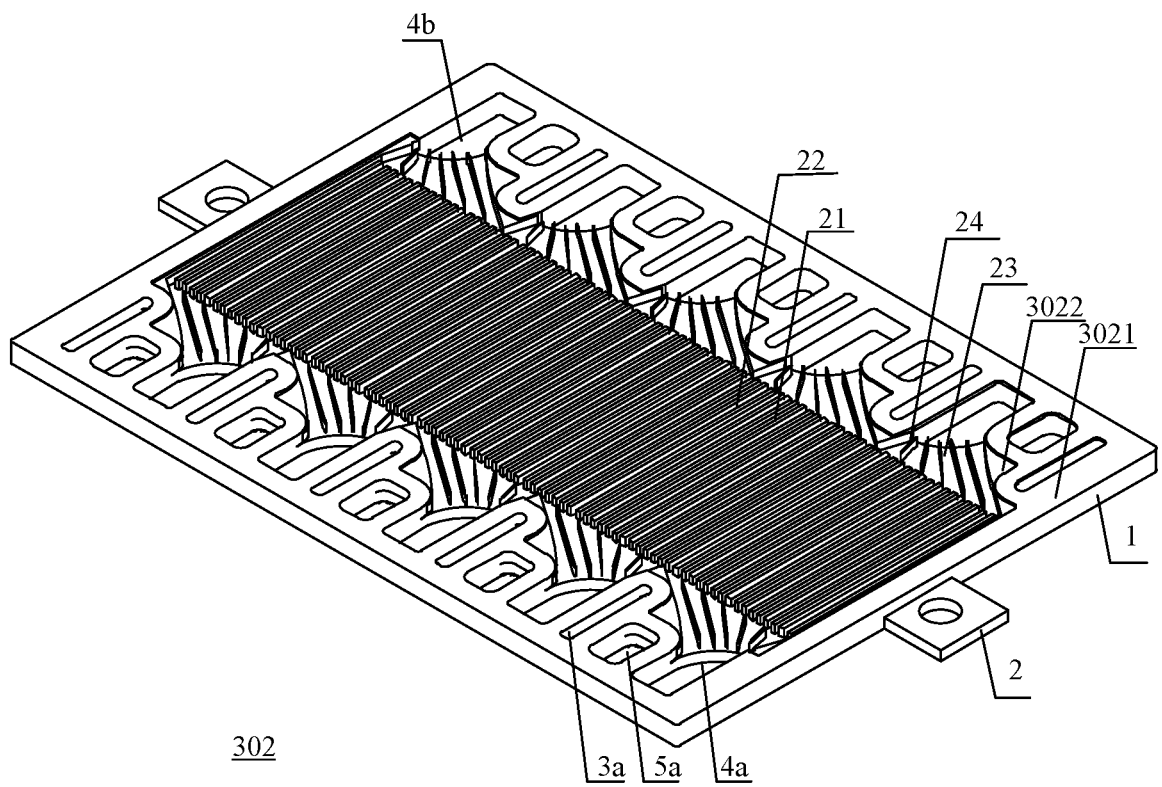

FIGS. 7 to 9 respectively show three-dimensional structural diagrams of different examples of a cathode plate according to a fourth embodiment of the present disclosure.

As shown in FIG. 7, on the first surface of the substrate 1 of the cathode plate 102, the flow-guiding grooves 23 of the flow-guiding structure and the flow channels 21 of the ultra-fine flow-field structure are grooves formed by laser engraving or chemical etching on the first surface, respectively. A peripheral portion 1021 of the substrate 1 is formed with a depression relative to the first surface to form a seal groove that matches the sealing frame. A partition wall 1022 is formed at the periphery of the flow-guiding structure so that the flow-guiding structures of adjacent ones are separated from each other and the positioning of the sealing frame is also facilitated. The top surface of the partition wall 1022 is, for example, flush with the first surface. As described above at least portions of the sidewalls of the third through hole 4a and the fourth through hole 4b are concave so as to extend to the bottom surface of the flow-guiding groove 23 and together with the partition wall 1022 form a circumferential opening in the curved sidewall. An additional sealing frame may be provided on the peripheral portion 1021 of the substrate 1 to form a cathode plate assembly.

As shown in FIG. 8, on the first surface of the substrate 1 of the cathode plate 202, the flow-guiding grooves 23 of the flow-guiding structure and the flow channels 21 of the ultra-fine flow-field structure are grooves formed by laser engraving or chemical etching on the first surface, respectively. A peripheral portion 2021 of the substrate 1 is formed with a depression relative to the first surface to form a sealing groove that matches the sealing frame. The peripheral portion 2021 of the substrate 1 is, for example, flush with the first surface and functions as a partition wall so that the flow-guiding structures of adjacent ones are separated from each other. As described above at least portions of the sidewalls of the third through hole 4a and the fourth through hole 4b are concave so as to extend to the bottom surface of the flow-guiding groove 23 forming a circumferential opening in the curved sidewall together with the peripheral portion 2021 of the substrate 1. An additional sealing frame may be provided on the peripheral portion 2021 of the substrate 1 to form a cathode plate assembly.

As shown in FIG. 9, on the first surface of the substrate 1 of the cathode plate 302, the flow-guiding grooves 23 of the flow-guiding structure and the flow channels 21 of the ultra-fine flow-field structure are grooves formed by laser engraving or chemical etching on the first surface, respectively. The peripheral portion 3021 of the substrate 1 protrudes with respect to the first surface. A partition wall 3022 is formed at the periphery of the flow-guiding structure such that the flow-guiding structures of adjacent ones are separated from each other, and the top surface of the partition wall 3022 is flush with the first surface for example. As described above at least portions of the sidewalls of the third through hole 4a and the fourth through hole 4b are concave so as to extend to the bottom surface of the flow-guiding groove 23 and together with the partition wall 3022 form circumferential openings on the curved sidewalls. The peripheral portion 2021 of the substrate 1 can also serve as a seal so that an additional sealing frame can be omitted.

In the fourth embodiment taking the cathode plate in the bipolar plate as an example different configurations of the substrate peripheral portion of the cathode plate and the circumferential opening of the second through hole are described in conjunction with FIGS. 7 to 9. It will be appreciated that a similar configuration may be employed in the anode plate i.e. the substrate peripheral portion of the anode plate may be recessed protruded or flush with respect to the first surface.

The cathode plate according to a fourth embodiment has the functions of distributing oxidizing gas conducting electrons dissipating heat and supporting plate. The first surface of the cathode plate includes an ultra-fine flow-field structure and flow-guiding structures for supplying oxidizing gas. Each of the flow-guiding structures include a plurality of grooves being arranged radially. Circumferential openings are formed as being inclined on the curved sidewalls of the third through hole and the fourth through hole, from which oxidizing gas flows in and out of the flow-guiding structure, thereby maximizing the width of the circumferential opening in a case that the width of the through hole is limited. The flow-guiding structures on the first surface of the cathode plate are designed such that a flow resistance of the fuel fluid is different at an inlet and an outlet of the flow passage, so that the distribution of the oxidizing gas on the cathode plate is more uniform. Meanwhile, a concentration of the oxidizing gas in a plane direction of the membrane electrode assembly is also increased, and an energy loss of electrochemical reaction is reduced. Therefore, the fuel cell using the cathode plate can improve the area-specific power.

In a preferred embodiment, where a plurality of distributing regions are formed on the surface of the cathode plate, each distributing region has a respective flow-field structure and a pair of through holes and a pair of flow-guiding structures separated from each other. When the number of the distributing regions and the number of cathode plates are increased, uniform distribution of fluid among the distributing regions of each plate and among different plates can still be ensured. This design enables an increase or a decrease of an active area by flexibly setting the number of distributing regions on the cathode plate according to power requirements of the fuel cell. Further, the flow-guiding structures of a plurality of distributing regions of a cathode plate include a plurality of groups of flow-guiding grooves which are separated from each other. Even in a case that some distributing regions of the cathode plate are damaged or flow of a reactant is blocked due to failure of the some distributing regions, other distributing regions of the cathode plate can still maintain normal operation, only with decrease of an overall output power of the fuel cell stack. Therefore, the fuel cell using the cathode plate can be manufactured in modules in a flexible manner and with improved reliability.

In a preferred embodiment, a second surface of the cathode plate includes a flow-field structure and flow-guiding structures of a coolant to effectively carry away heat generated by the electrochemical reaction, so that the cathode plate also is used as a heat dissipation plate. The flow field of the coolant on the second surface of the cathode plate includes flow channels of a zigzag shape to increase a passage length and to improve a cooling effect. The cathode plate can improve the flow uniformity of the fuel cell and improve the hydrothermal management, thereby improving the high-current discharge performance and the power density of the fuel cell.

Fifth Embodiment

A cathode plate assembly according to the fifth embodiment includes a cathode plate, a gasket and a sealing frame located on a first surface of the cathode plate, and a sealing frame located on a second surface of the cathode plate. The cathode plate is, for example, the one described in detail above in connection with the fourth embodiment. For the sake of simplicity, an internal structure of the cathode plate will not be described in detail below. In FIGS. 10 to 12, only top views of a gasket on a first surface of the cathode plate, a sealing frame on the first surface of the cathode plate, and a sealing frame on a second surface of the cathode plate in the cathode plate assembly are shown As shown in FIG. 10, the gasket 236 in the cathode plate assembly includes a first sub-sheet 2361 and a second sub-sheet 2362. Near a first edge of the substrate of the cathode plate 102, the first sub-sheet 2361 covers a top surface of the flow-guiding structure at the inlet of the first surface of the cathode plate 102. Near a second edge of the substrate of the cathode plate 102 the second sub-sheet 2362 covers a top surface of the flow-guiding structure at the outlet of the first surface of the cathode plate 102. The first sub-sheet 2361 and the second sub-sheet 2362 have shapes that corresponding to the top surface of the flow-guiding structure of the first surface of the cathode plate 102 such that the upper portion of the flow-guiding grooves of the first surface of the cathode plate 102 are closed to form flow-guiding channels.

The gasket 236 is used for closing the top surface of the flow-guiding structure of the oxidizing gas to prevent the flow-guiding grooves from being blocked by a rim of the membrane electrode assembly which is deformed by pressure when the fuel cell is assembled and pressed. The gasket 236 may be made of a material having high mechanical strength and good temperature stability, such as graphite, stainless steel, titanium alloy, aluminum alloy copper alloy, and the like.

As shown in FIG. 11, the sealing frame 238 of the first surface of the cathode plate in the cathode plate assembly includes a rim frame 2381 and a central opening 2382 surrounded by the rim frame 2381. Near a first edge of the frame 2381, a plurality of groups of through holes are formed and arranged in a row, and each group of through holes includes a first through hole 2383a, a fifth through hole 2385a, and a third through hole 2384a arranged in sequence. Near a second edge of the frame 2381, a plurality of groups of through holes are formed and arranged in a row, and each group of through holes includes a fourth through hole 2384b, a sixth through hole 2385b, and a second through hole 2383b arranged in sequence. In the cathode plate assembly, a rim frame 2381 of the sealing frame 238 contacts a peripheral portion of the cathode plate, and the first to sixth through holes of the sealing frame 238 are aligned with the first to sixth through holes of the cathode plate 102, respectively, thereby forming portions of an inflow passage and an outflow passage of the first, second and third main pipelines. The central opening of the sealing frame 238 exposes the ultra-fine flow-field structure of the cathode plate 102. The central opening 2382 of the sealing frame 238 is separated from the first and second through holes and the fifth and sixth through holes so that the fuel fluid and the coolant cannot reach the ultra-fine flow-field structure of the cathode plate 102. The central opening 2382 of the sealing frame 238 is in communication with the third and fourth through holes, and the circumferential openings of the third and fourth through holes of the cathode plate 102 are in communication with the flow-guiding structure of the oxidizing gas, such that only the oxidizing gas reaches the ultra-fine flow-field structure of the cathode plate 102 via the flow-guiding structures.

In this embodiment the sealing frame 238 in the cathode plate assembly may be made of a pre-formed sealing frame, or may be a glue strip which is formed by gluing and curing on the first surface of the cathode plate 102.

As shown in FIG. 12, a sealing frame 338 on a second surface of the cathode plate in the cathode plate assembly includes a rim frame 3381 and a central opening 3382 surrounded by the rim frame 3381. Near a first edge of the frame 3381, a plurality of groups of through holes are formed and arranged in a row, and each group of through holes includes a first through hole 3383a, a fifth through hole 3385a, and a third through hole 3384a arranged in sequence. Near a second edge of the frame 3381, a plurality of groups of through holes are formed and arranged in a row, and each group of through holes includes a fourth through hole 3384b, a sixth through hole 3385b, and a second through hole 3383b arranged in sequence. In the cathode plate assembly, the rim frame 3381 of the sealing frame 338 contacts a peripheral portion of the cathode plate, and the first to sixth through holes of the sealing frame 338 are aligned with the first to sixth through holes of the cathode plate 102, respectively, thereby forming portions of an inflow passage and an outflow passage of the first, second and third main pipelines. The central opening of the sealing frame 338 exposes a flow-field structure of a coolant of the cathode plate 102. The central opening 3382 of the sealing frame 338 is separated from the first and second through holes and the third and fourth through holes so that the fuel fluid and oxidizing gas cannot reach the flow-field structure of the coolant of the cathode plate 102. The central opening 3382 of the sealing frame 338 is in communication with the fifth and sixth through holes, and circumferential openings of the fifth and sixth through holes of the cathode plate 102 are in communication with the flow-guiding structure of the coolant, so that only the coolant reaches the ultra-fine flow-field structure of the cathode plate 102 via the flow-guiding structures.

In this embodiment, the sealing frame 338 in the cathode plate assembly may be made of a pre-formed sealing frame, or a glue strip which is formed by gluing and curing on the second surface of the cathode plate 102.

In the cathode plate assembly according to of the fifth embodiment, on the first surface of the cathode plate, the fuel fluid, the oxidizing gas, and the coolant are respectively sealed with a sealing frame on the surface of the cathode plate 102, and the top surface of the flow-guiding structure of the oxidizing gas is sealed with a gasket to form a flow-guiding channel. Because the sealing frame has the function of separating the first and second through holes, as well as the fifth and sixth through holes, from the flow-guiding structure and the ultra-fine flow-field structure on the first surface of the cathode plate, only the oxidizing gas reaches the ultra-fine flow-field structure on the first surface of the cathode plate through the circumferential openings of the third and fourth through holes and the closed flow-guiding channel. The ultra-fine flow-field structure at a central portion of the cathode plate is directly exposed to the second surface of the membrane electrode assembly, so that oxidizing gas can be supplied to a cathode side of the membrane electrode assembly via the flow channel surface. In this embodiment, the sealing frame has the functions of preventing leakage of the reactant and the coolant from the surface of the cathode plate to the outside of the fuel cell (i.e. inner leakage), but also to prevent mutual leakage between the reactant and the coolant (i.e. external leakage). Even in a case that an internal temperature of the fuel cell rises, the sealing frame in the cathode plate assembly can complement distance variations between the anode plate and the membrane electrode assembly to maintain sealing performance. Therefore, the fuel cell using the cathode plate assembly according to the fifth embodiment or similar cathode plate assembly can improve the stability of continuous high-current discharge.

Figure 13:
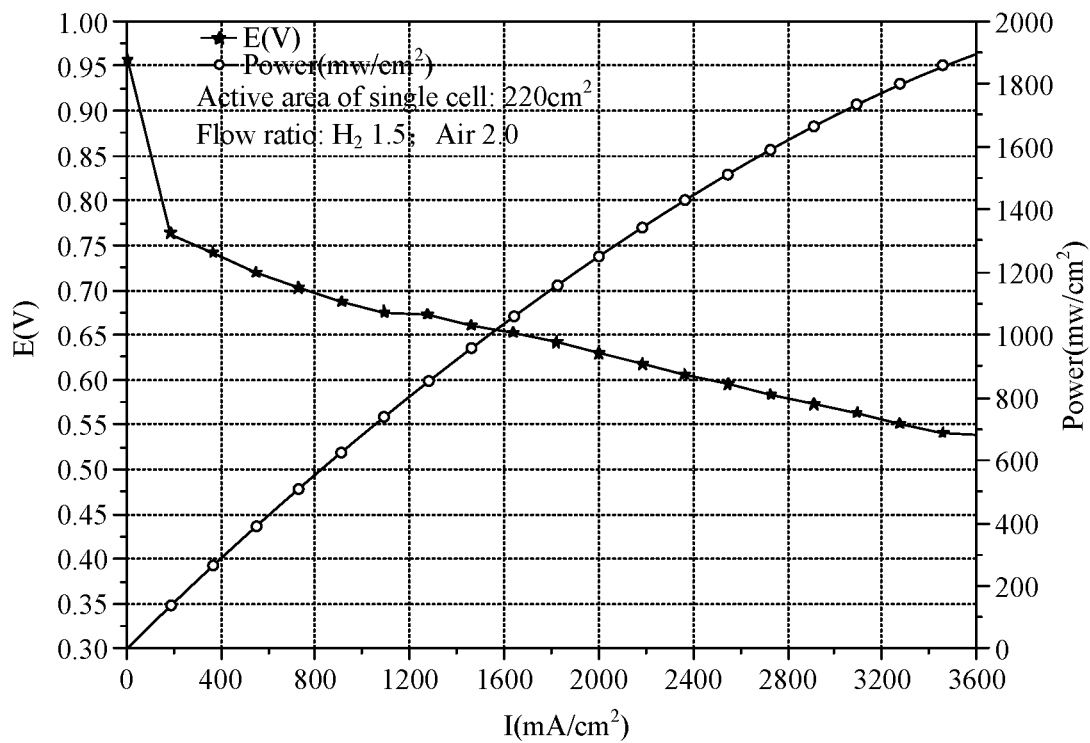
FIG. 13 shows a discharge curve of a fuel cell including the bipolar plate assembly according to an embodiment of the present disclosure.

FIG. 13 shows a discharge curve of a fuel cell including the bipolar plate assembly according to an embodiment of the present disclosure. An active area of a single cell in the fuel cell stack exceeds 200 square centimeters.

As one can be seen from the graph in the figure, the polar plate according to the present disclosure has excellent high-current discharge performance. At a current density of 2.0 A/cm, a single-cell voltage is 0.63 V. At the current density of 2.5 A/cm, the single-cell voltage is 0.6 V. At the current density as high as 3.6 A/cm, the single-cell voltage is still 0.54 V and a power density is as high as 1901 mw/cm. It shows that the fuel cell stack using the bipolar plates according to the present disclosure can significantly improve a high-current discharge performance of the battery. It exceeds the high-current discharge performance of the fuel cell having been published in China.

The fuel cell according to the above embodiment of the present disclosure can be used in electric vehicles. The power performance, fuel utilization efficiency and cruising range of the electric vehicles can be improved due to the high power density and high-current discharge performance of the fuel cell.

In the first embodiment described above, it is described that a fuel cell 100 includes a first terminal plate 110 and a second terminal plate 120 opposite to each other, and a first insulating plate 131, a first current collector 132, a repetitive unit 133, a second current collector 134, and a second insulating plate 135 are stacked in order therebetween. The stack of the fuel cell 100 includes for example a plurality of repetitive units 133 stacked together and electrically connected to each other to increase the output voltage. In alternative embodiments, the bipolar plate in the repetitive unit 133 of the fuel cell may also function as a current collector, and the sealing frame in the repetitive unit 133 may also function as an insulating plate, so that at least one of the first insulating plate 131, the first current collector 132, the second current collector 134, and the second insulating plate 135 may be omitted, thereby further reducing the number of components in the fuel cell 100. Due to the reduction in the number of parts of the fuel cell 100 and the optimization of the structural design, the fuel cell 100 according to this embodiment can reduce a height size and a lateral size of the fuel cell 100, which is beneficial for miniaturization of the fuel cell 100 and further improves the power density.

In the second to fifth embodiments described above, a bipolar plate (anode plate 101 or a cathode plate 102) of a fuel cell 100 is described. The bipolar plate includes through holes, each of which has a cross section of approximately trapezoid with an arc edge. A circumferential opening is formed on a curved sidewall of the through hole as an inflow or outflow of reactant, thereby maximizing a width of the circumferential opening in a case that a width of the through hole is limited. In an alternative embodiment, a bipolar plate (anode plate 101 or cathode plate 102) of a fuel cell 100 includes through holes, each of which has a cross section of approximately trapezoid with an oblique edge. A circumferential openings is formed on an oblique sidewall of the through holes as an inflow or outflow of reactant, thereby maximizing a width of the circumferential opening in a case that a width of the through holes is limited. In the bipolar plate, the cross section of the through hole is designed to maximize the width of the circumferential opening, so as to reduce a flow resistance of the reactant when flowing through the circumferential opening and make the reactant flow more smoothly.

It should be noted that, In the present disclosure's description, the terms "including", "including" or any other variation thereof are intended to encompass non-exclusive inclusion, so that a process, method, article or equipment that includes a group of elements includes not only those elements but also other elements that are not explicitly listed, or also elements inherent to such a process, method, article or equipment. In the absence of further limitations, an element defined by the phrase "includes an . . . " does not preclude the existence of another identical element in the process, method, article or equipment in which the element is included.

Finally it should be noted that it is obvious that the above-described embodiments are merely illustrative for the purpose of clearly illustrating the present disclosure and are not limited to the embodiments. Other variations or alterations in different forms may be made on the basis of the above description for those of ordinary skill in the art. All embodiments need not and cannot be exhaustive here. However, the obvious changes or changes arising from this are still in the scope of protection of the present disclosure rights.

The invention claimed is:

1. A bipolar plate for a fuel cell, comprising:
a substrate;
a plurality of distributing regions on a first surface of the substrate, for supplying a first reactant to a membrane electrode assembly of the fuel cell;
a plurality of first through holes adjacent to a first edge of the substrate and penetrating through the substrate, each of which has a circumferential opening extending laterally on a sidewall and being communicated with the corresponding one of the at the plurality of distributing regions, as inlets of a first reactant; and
a plurality of second through holes adjacent to a second edge of the substrate and penetrating through the substrate, each of which has a circumferential opening extending laterally on a sidewall and being communicated with the corresponding one of plurality of distributing regions, as outlets of the first reactant, the second edge being opposite to the first edge,
wherein each of the plurality of first through holes and the plurality of second through holes has a cross section of approximately trapezoid with an arc edge or an oblique edge, the circumferential openings of the plurality of second through holes are opposite to each other along the first edge
wherein each of the plurality of distributing regions comprises a first flow-guiding structure adjacent to the opening of the corresponding one of the plurality of first through holes, a second flow-guiding structure adjacent to the opening of the corresponding one
of the plurality of second through holes, and a first flow-field structure between the first flow-guiding structure and the second flow-guiding structure, and the first flow-field structures of the plurality of distributing regions are arranged in sequence on the first surface of the substrate to form a plurality of groups of first flow channels.

2. The bipolar plate according to claim 1, wherein the:
first flow-field structure has a plurality of the first flow channels separated from each other by a plurality of ridges, the plurality of the first flow channels extending from an inlet of the first flow-field structure to the outlet of the first flow-field structure;
the first flow-guiding structure has a plurality of first grooves separated from each other by a plurality of first spacers, the plurality of first grooves being arranged radially and extending from the circumferential opening of the corresponding one of the plurality of first through holes to the inlet of the first flow-field structure; and
the second flow-guiding structure has a plurality of second grooves separated from each other by a plurality of second spacers, the plurality of second grooves being arranged radially and extending from the circumferential opening of the corresponding one of the at least the plurality of second through holes to the outlet of the first flow-field structure.

3. The bipolar plate according to claim 2, wherein the plurality of first grooves of the first flow-guiding structure have a cross-sectional area which is gradually increased in a flow passage of the first reactant, and the plurality of second grooves of the second flow-guiding structure has a cross-sectional area which is gradually decreased in the flow passage of the first reactant.

4. The bipolar plate according to claim 2, wherein the plurality of the first flow channels of the first flow-field structure is of any shape of a linear shape, a curved shape and a serpentine shape.

5. The bipolar plate according to claim 2, wherein the bipolar plate is an anode plate, and the first reactant that is supplied form the anode plate to the membrane electrode assembly is a fuel fluid, and the first through hole has a top edge and a bottom edge in the cross section, and a length of the top edge is ⅓ to ¹⁹⁄₂₀ of that of the bottom edge.

6. The bipolar plate according to claim 5, wherein the plurality of the first flow channels of the first flow-field structure includes 25 to 70 channels.

7. The bipolar plate according to claim 5, wherein a ridge width of the first flow-field structure is between 30 and 500 microns, and a channel width of the first flow-field structure is between 30 and 500 microns.

8. The bipolar plate according to claim 5, wherein the first grooves of the first flow-guiding structure have 2 to 10 grooves, and the second grooves of the second flow-guiding structure have 2 to 10 grooves, respectively.

9. The bipolar plate according to claim 2, wherein the bipolar plate is a cathode plate, and the first reactant that is supplied form the anode plate to the membrane electrode assembly is an oxidizing gas, and the first through hole has a top edge and a bottom edge in the cross section, and a length of the top edge is ⅙ to ⅚ of that of the bottom edge.

10. The bipolar plate according to claim 9, wherein the plurality of the first flow channels of the first flow-field structure have 25 to 70 channels.

11. The bipolar plate according to claim 9, wherein the first flow-field structure has a ridge width of between 30 and 500 microns and a channel width of between 30 and 500 microns.

12. The bipolar plate according to claim 9, wherein the first grooves of the first flow-guiding structure have 2 to 10 grooves, and the second grooves of the second flow-guiding structure have 2 to 10 grooves, respectively.

13. The bipolar plate according to claim 2, wherein the at least one distributing region 15 includes a plurality of distributing regions, the first flow-field structures of the plurality of distributing regions are arranged in sequence on the first surface of the substrate to form a plurality of groups of first flow channels, the first flow-guiding structures of the plurality of distributing regions are separated from each other, and the second flow-guiding structures of the plurality of distributing regions are separated from each other.

14. The bipolar plate according to claim 13, wherein the substrate includes a peripheral portion which is recessed relative to the first surface and is used as a sealing groove.

15. The bipolar plate according to claim 13, wherein the substrate includes a peripheral portion which protrudes relative to the first surface and is used as a sealing member.

16. The bipolar plate according to claim 13, wherein the substrate includes a peripheral portion which flushes with the first surface and is used as a contact surface of a sealing frame.

17. The bipolar plate according to claim 13, further comprising: a plurality of partition walls located between the first flow-guiding structures and between the second flow-guiding structures of adjacent ones of the plurality of distributing regions.

18. The bipolar plate according to claim 1, further comprising:

a plurality of third through holes adjacent to the first edge of the substrate and penetrating through the substrate, as inlets of a second reactant;

a plurality of fourth through holes adjacent to the second edge of the substrate and penetrating through the substrate, as outlets of the second reactant;

a plurality of fifth through holes adjacent to the first edge of the substrate and penetrating through the substrate, as an inlet of a coolant; and a plurality of sixthrough holes adjacent to the second edge of the substrate and penetrating through the substrate, as an outlet of the coolant.

19. The bipolar plate according to claim 18, wherein the a plurality of first through holes, the plurality of third through holes and the plurality of fifth through holes are arranged in a row on the first edge of the substrate in the order of a first through hole, a fifth through hole and a third through hole, and the plurality of second through holes, the plurality of fourth through holes, plurality of sixth through holes are arranged in a row on the second edge of the substrate in the order of a fourth through hole, a sixth through hole and a second through hole.

20. The bipolar plate according to claim 18, wherein each of the plurality of fifth through holes and the plurality of sixth through holes has a cross section of an approximately-rectangular shape, and a side edge of the cross section of each of the plurality of fifth through-holes is adjacent to a top edge of the cross section of each of the plurality of first through holes, and a side edge of the cross section of each of the plurality of sixth through holes is adjacent to a top edge of the cross section of the corresponding one of the plurality of second through holes cross-sectional shape, and a length of the side edge is less than or equal to a length of the top edge.

21. The bipolar plate according to claim 18, further comprising: a plurality of cooling regions on a second surface of the substrate, each of which is communicated with the corresponding one of plurality of fifth through holes and the corresponding one of the plurality of sixth through holes, for supplying a coolant to a second surface of the bipolar plate.

22. The bipolar plate according to claim 1, wherein the substrate further has a third edge and a fourth edge opposite to each other, and tabs are formed on the third edge and the fourth edge, and the tabs are used as test terminals when testing the fuel cell.

23. The bipolar plate according to claim 22, wherein each of the tabs includes a positioning hole for aligning a plurality of bipolar plates.

24. A bipolar plate assembly for a fuel cell, comprising:
a bipolar plate according to claim 1;
a sealing frame having a rim which contacts a peripheral portion of the bipolar plate and a central opening of the sealing frame which exposes an active region of the bipolar plate; and
a gasket which covers top surfaces of the first and second flow-guiding structures of the plurality of distributing regions to form a closed flow-guiding channel.

25. The bipolar plate assembly according to claim 24, wherein the sealing frame includes a plurality of through holes which are aligned with a plurality of through holes in the bipolar plate respectively, a central opening which communicates with the plurality of first through holes and the plurality of second through holes of the sealing frame, so that the first reactant flows into the first flow-guiding structure through a circumferential opening of the plurality of first through holes and flows out of the second flow-guiding structure through a circumferential opening of the plurality of second through holes.

26. The bipolar plate assembly according to claim 24, wherein the gasket comprises:
   a first sub-sheet which covers the top surface of the first flow-guiding structure; and
   a second sub-sheet which covers the top surface of the second flow-guiding structure.

27. A fuel cell, comprising:
   a repetitive unit which includes an anode plate, a cathode plate, a membrane electrode assembly sandwiched therebetween, and a first group of main pipelines, a second group of main pipelines, and a third group of main pipelines which are formed at peripheral portions of the repetitive unit and extend in a stacking direction; and
   a flow-distributing unit which includes a first terminal plate, and a first pair of manifolds, a second pair of manifolds and a third pair of manifolds which are formed in the first terminal plate and respectively communicate with the first group of main pipelines, the second group of main pipelines and the third group of main pipelines, for transferring a fuel fluid, an oxidizing gas and a coolant, respectively,
   wherein each of the anode plate and the cathode plate is the one according to claim 1.

28. The fuel cell according to claim 27, further comprising:
   a first current collector and a first insulating plate stacked in sequence on a first surface of the repetitive unit;
   a second current collector and a second insulating plate stacked in sequence on the second surface of the repetitive unit; and
   a second terminal plate, the first terminal plate and the second terminal plate securing the repetitive unit, the first current collector, the second current collector, the first insulating plate and the second insulating plate,
   wherein the first insulating plate is sandwiched between the first terminal plate and the first current collector, the second insulating plate is sandwiched between the second terminal plate and the second current collector, and the first group of main pipelines, the second group of main pipelines, and the third group of main pipelines pass through the first current collector and the first insulating plate in a stacking direction.

29. The fuel cell according to claim 28, further comprising:
   a first pressing plate and a second pressing plate located on opposite sides of the fuel cell, each of which has a lower flange and an upper flange,
   wherein the lower flange of the first pressing plate is in contact with one bottom edge of the first terminal plate, the lower flange of the second pressing plate is in contact with another bottom edge of the first terminal plate, and the upper flange of the first pressing plate is in contact with one top edge of the first terminal plate, the upper flange of the second pressing plate is in contact with another top edge of the second terminal plate, so that the lower flanges press against the bottom surface of the first terminal plate, and the upper flanges press against the top surface of the second terminal plate, to provide a securing force between the first terminal plate and the second terminal plate.

30. The fuel cell according to claim 29, wherein each of the upper flange of the first pressing plate and the upper flange of the second pressing plate further includes a plurality of screw holes, through which a plurality of bolts pass and apply additional pressure to the top surface of the second terminal plate.

31. The fuel cell according to claim 27, further comprising:
   a first interconnect plate and a second interconnect plate which are located at opposite side surfaces of the first terminal plate and each of which includes a plurality of interfaces for connecting a plurality of external pipelines,
   wherein inner openings of the plurality of interfaces in the first interconnect plate and in the second interconnect plate are respectively aligned with openings of the first pair of manifolds, the second pair of manifolds and the third pair of manifolds in the flow-distributing unit to communicate with each other.

* * * * *